United States Patent
Wong et al.

(10) Patent No.: US 12,375,250 B2
(45) Date of Patent: Jul. 29, 2025

(54) COMMUNICATIONS DEVICE, INFRASTRUCTURE EQUIPMENT AND METHODS

(71) Applicant: Sony Group Corporation, Tokyo (JP)

(72) Inventors: Shin Horng Wong, Basingstoke (GB); Martin Warwick Beale, Basingstoke (GB); Yassin Aden Awad, Basingstoke (GB); Naoki Kusashima, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/031,014

(22) PCT Filed: Sep. 22, 2021

(86) PCT No.: PCT/EP2021/076080
§ 371 (c)(1),
(2) Date: Apr. 10, 2023

(87) PCT Pub. No.: WO2022/083961
PCT Pub. Date: Apr. 28, 2022

(65) Prior Publication Data
US 2023/0379127 A1 Nov. 23, 2023

(30) Foreign Application Priority Data
Oct. 20, 2020 (EP) ..................................... 20202915

(51) Int. Cl.
*H04L 5/00* (2006.01)
*H04L 1/1829* (2023.01)

(52) U.S. Cl.
CPC .......... *H04L 5/0055* (2013.01); *H04L 1/1854* (2013.01); *H04L 1/1861* (2013.01)

(58) Field of Classification Search
CPC ... H04L 5/0055; H04L 1/1854; H04L 1/1861; H04L 5/0007; H04L 5/1469; H04L 1/1896
(Continued)

(56) References Cited

U.S. PATENT DOCUMENTS

| | | | |
|---|---|---|---|
| 2011/0223924 A1* | 9/2011 | Lohr | H04W 72/23 370/252 |
| 2013/0223356 A1* | 8/2013 | Khoshnevis | H04W 72/23 370/329 |

(Continued)

FOREIGN PATENT DOCUMENTS

| | | |
|---|---|---|
| EP | 3910852 A1 | 11/2021 |
| WO | WO-2019220595 A1 * | 11/2019 |

(Continued)

OTHER PUBLICATIONS

International Search Report and Written Opinion mailed on Dec. 9, 2021, received for PCT Application PCT/EP2021/076080, filed on Sep. 22, 2021, 10 pages.

(Continued)

*Primary Examiner* — Albert Decady
*Assistant Examiner* — Osman M Alshack
(74) *Attorney, Agent, or Firm* — XSENSUS, LLP

(57) ABSTRACT

A method of transmitting acknowledgement information, includes receiving from an infrastructure equipment of a wireless communications network an indication of a plurality of instances of downlink communications resources associated with a semi-persistent resource allocation, the plurality of instances of downlink communications resources allocated for the transmission of data by the infrastructure equipment to the communications device via a wireless access interface, determining that one or more uplink communication resources allocated for the transmis- (Continued)

sion of a portion of acknowledgement information indicating an acknowledgement status of a respective instance of the downlink communication resources is invalid and cannot be used for the transmission of the acknowledgement information, selecting, from a plurality of outstanding portions of acknowledgement information which have not been transmitted, a subset of portions of acknowledgement information, and transmitting to the infrastructure equipment the selected subset of portions of acknowledgement information using a single instance of uplink communication resources.

19 Claims, 18 Drawing Sheets

(58) Field of Classification Search
USPC .................................................. 714/748–750
See application file for complete search history.

(56) References Cited

U.S. PATENT DOCUMENTS

| | | | | |
|---|---|---|---|---|
| 2016/0142898 | A1* | 5/2016 | Poitau | H04W 8/005 370/329 |
| 2017/0215203 | A1* | 7/2017 | Lee | H04W 72/12 |
| 2018/0205599 | A1* | 7/2018 | Lee | H04L 41/08 |
| 2018/0270722 | A1* | 9/2018 | Kim | H04W 36/0072 |
| 2018/0270803 | A1* | 9/2018 | Kwak | H04W 74/08 |
| 2019/0045521 | A1* | 2/2019 | Hong | H04W 72/21 |
| 2019/0116608 | A1* | 4/2019 | Kim | H04W 72/1263 |
| 2019/0199420 | A1* | 6/2019 | Faxér | H04L 5/0057 |
| 2019/0387383 | A1* | 12/2019 | Ye | H04W 4/70 |
| 2020/0359375 | A1* | 11/2020 | Hwang | H04L 5/0055 |
| 2021/0050948 | A1* | 2/2021 | Gao | H04L 1/1812 |
| 2021/0112623 | A1* | 4/2021 | Bae | H04W 8/24 |
| 2021/0176758 | A1* | 6/2021 | Bae | H04L 1/1864 |
| 2022/0264562 | A1* | 8/2022 | Choi | H04L 1/1854 |
| 2022/0407657 | A1* | 12/2022 | Gao | H04W 72/1268 |

FOREIGN PATENT DOCUMENTS

| | | | | |
|---|---|---|---|---|
| WO | | 2020/145704 A1 | 7/2020 | |
| WO | WO-2020197195 A1 * | | 10/2020 | ........... H04L 1/1607 |

OTHER PUBLICATIONS

ZTE, "Discussion on HARQ-ACK enhancements for eURLLC", 3GPP TSG RAN WG1 Meeting #102-e, R1-2005431, Aug. 17-28, 2020, 6 pages.
Moderator (Nokia), "Feature lead summary #4 on HARQ-ACK feedback enhancements for NR Rel-17 URLLC/IIoT (AI 8.3.1.1)", 3GPP TSG-RAN WG1 Meeting #102-e, R1-2007354, Aug. 17-28, 2020, pp. 1-141.
Nokia et al., "Revised WID: Enhanced Industrial Internet of Things (IoT) and ultra-reliable and low latency communication (URLLC) support for NR", 3GPP TSG RAN Meeting #88e, RP-201310, 6 pages.
3GPP, "NR; NR and NG-RAN Overall Description; Stage 2 (Release 15)", 3GPP TS 38.300 V15.2.0, Jun. 2018, pp. 1-87.
Holma et al., "LTE for UMTS OFDMA and SC-FDMA Based Radio Access", John Wiley & Sons, 2009, pp. 25-27.
Nokia et al., "On the necessity and support of Rel-17 URLLC HARQ-ACK feedback enhancements", 3GPP TSG RAN WG1 Meeting #102-e, R1-2006339, Aug. 17-28, 2020, 6 pages.
Huawei et al., "New WID: Physical Layer Enhancements for NR Ultra-Reliable and Low Latency Communication (URLLC)", 3GPP TSG RAN Meeting #83, RP-190726, Mar. 18-21, 2019, 5 pages.
3GPP, "Study on Scenarios and Requirements for Next Generation Access Technologies; (Release 14)", 3GPP TR 38.913 V14.3.0, Jun. 2017, 39 pages.

* cited by examiner

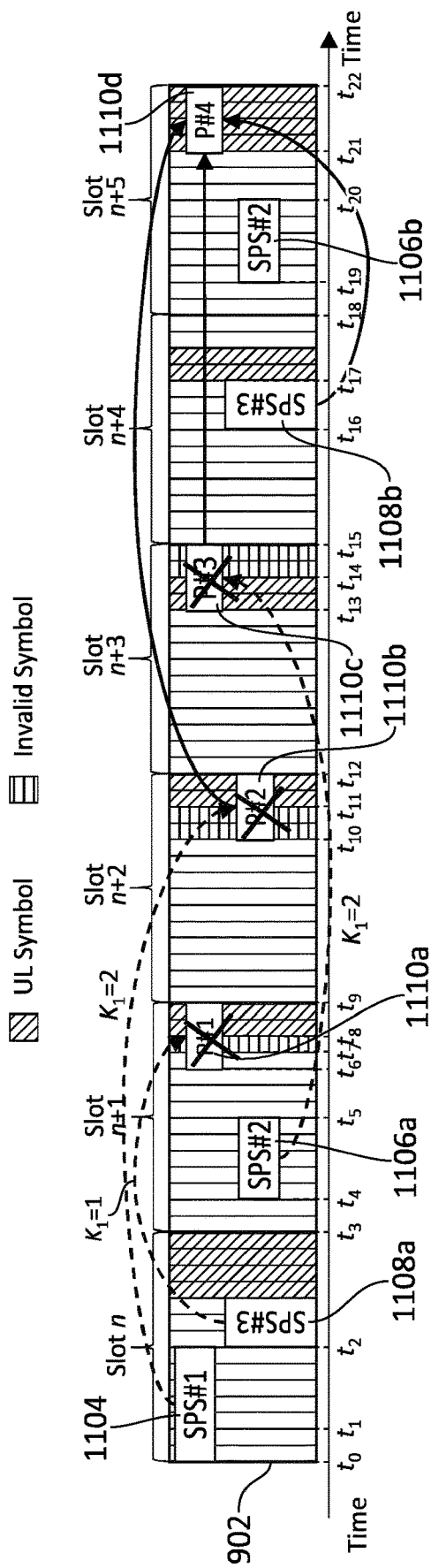
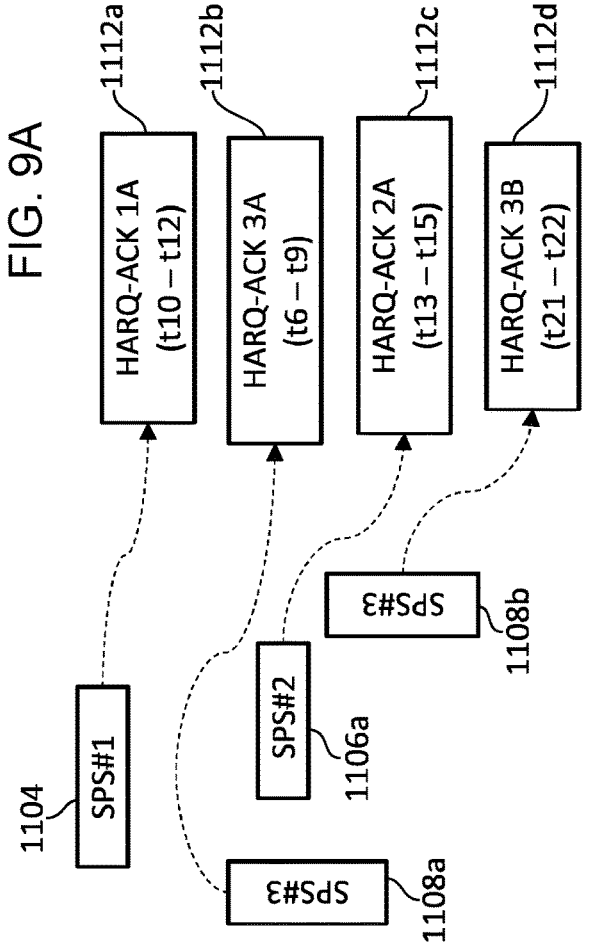
FIG. 9A
FIG. 9B

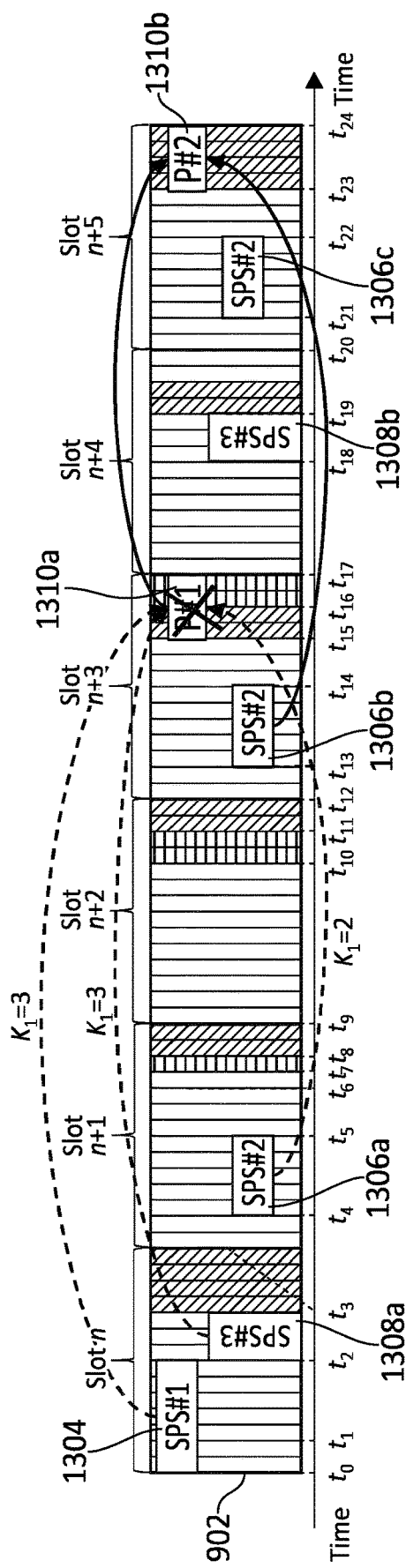
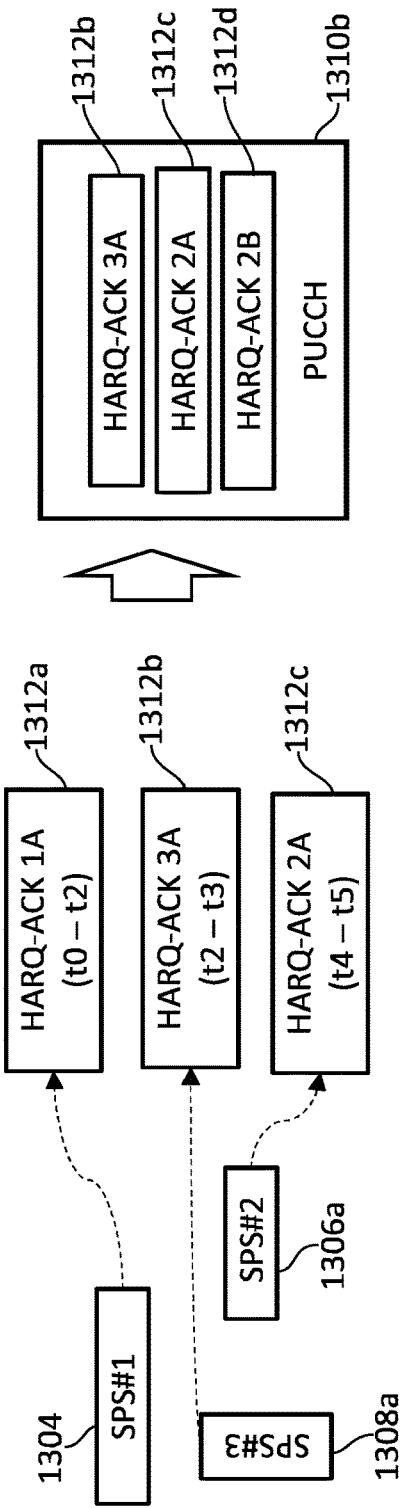
FIG. 11A
FIG. 11B

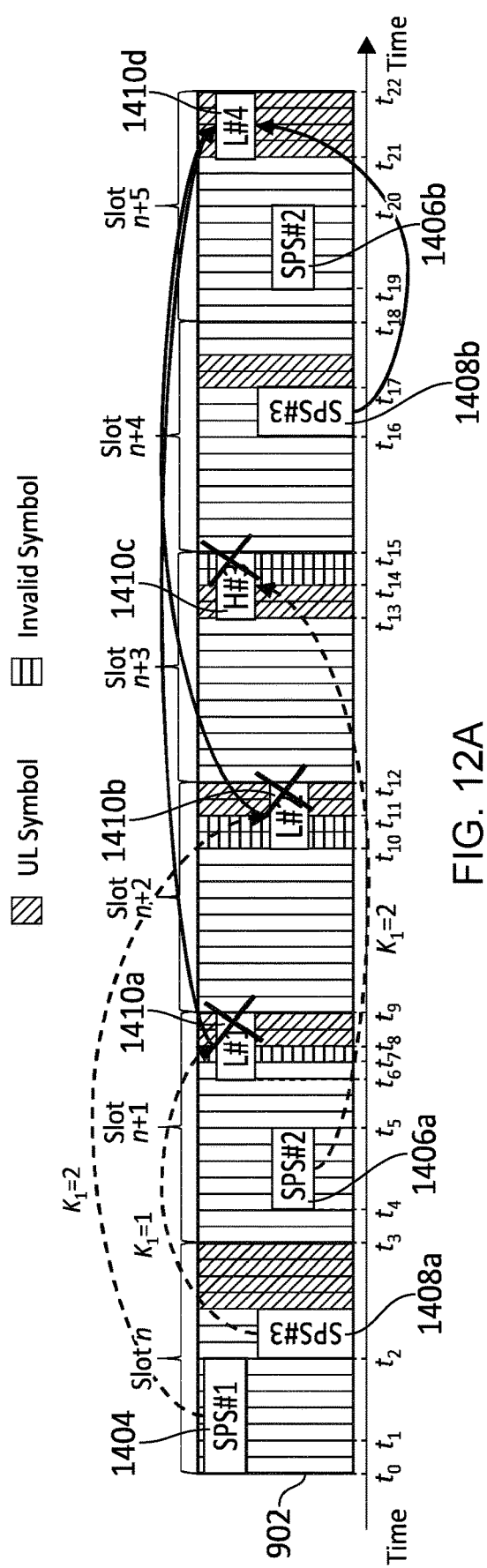
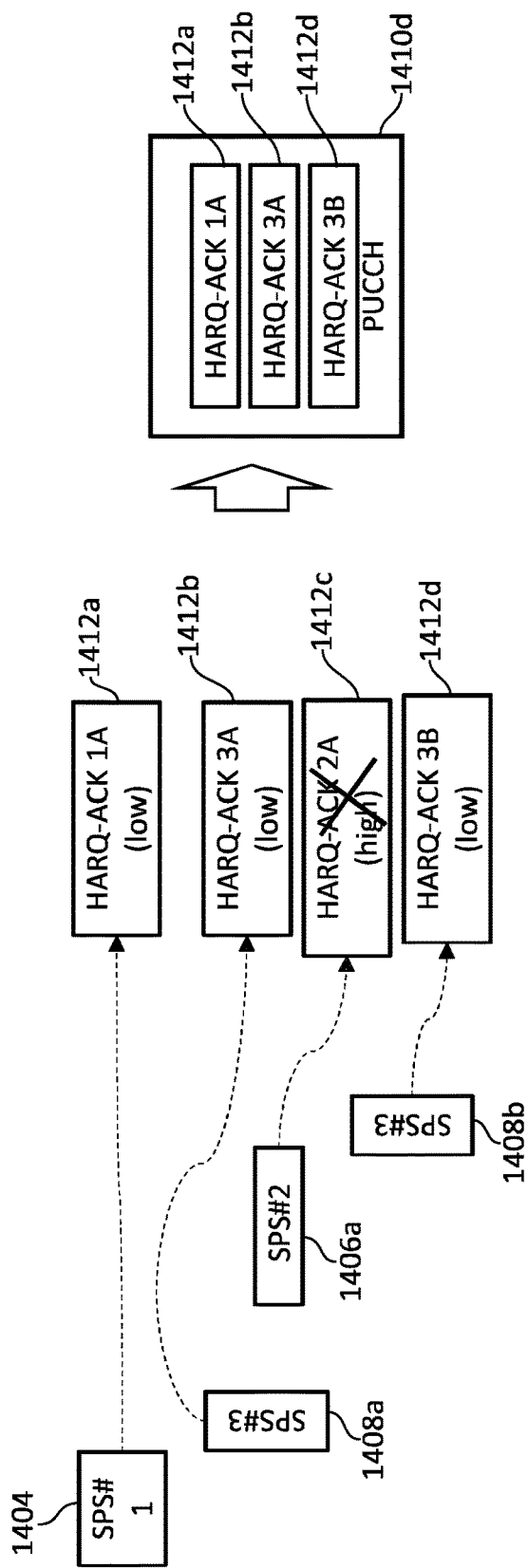
FIG. 12A
FIG. 12B

COMMUNICATIONS DEVICE, INFRASTRUCTURE EQUIPMENT AND METHODS

CROSS-REFERENCE TO RELATED APPLICATIONS

The present application is based on PCT filing PCT/EP2021/076080, filed Sep. 22, 2021, which claims the Paris convention priority to European patent application number EP20202915.3, filed Oct. 20, 2020, the contents of each are incorporated herein by reference in their entirety

BACKGROUND

Field

The present disclosure relates to communications devices, infrastructure equipment and methods for the transmission of acknowledgement information in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

Although most conventional services are provided by means of unicast data transmissions, many services may be more suited to the use of multicast or broadcast transmission. The provision of such services gives rise to new challenges for efficiently handling communications in wireless telecommunications systems that need to be addressed.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and:

FIG. 9A and FIG. 9B show the selection of outstanding portions of acknowledgement information for multiplexing and transmission using a single valid communications resource allocation, in accordance with embodiments of the present technique;

FIG. 11A and FIG. 11B show the selection of outstanding portions of acknowledgement information for multiplexing and transmission using a single valid communications resource allocation, in accordance with embodiments of the present technique, when two or more of the outstanding portions of acknowledgement information would have been transmitted using a single communications resource allocation which was invalid;

FIG. 12A and FIG. 12B show the selection of outstanding portions of acknowledgement information for multiplexing and transmission using a single valid communications resource allocation, in accordance with embodiments of the present technique, when filter criteria based on a layer 1 priority are applied;

DETAILED DESCRIPTION OF THE EMBODIMENTS

Long Term Evolution Advanced Radio Access Technology (4G)

Figure 1:
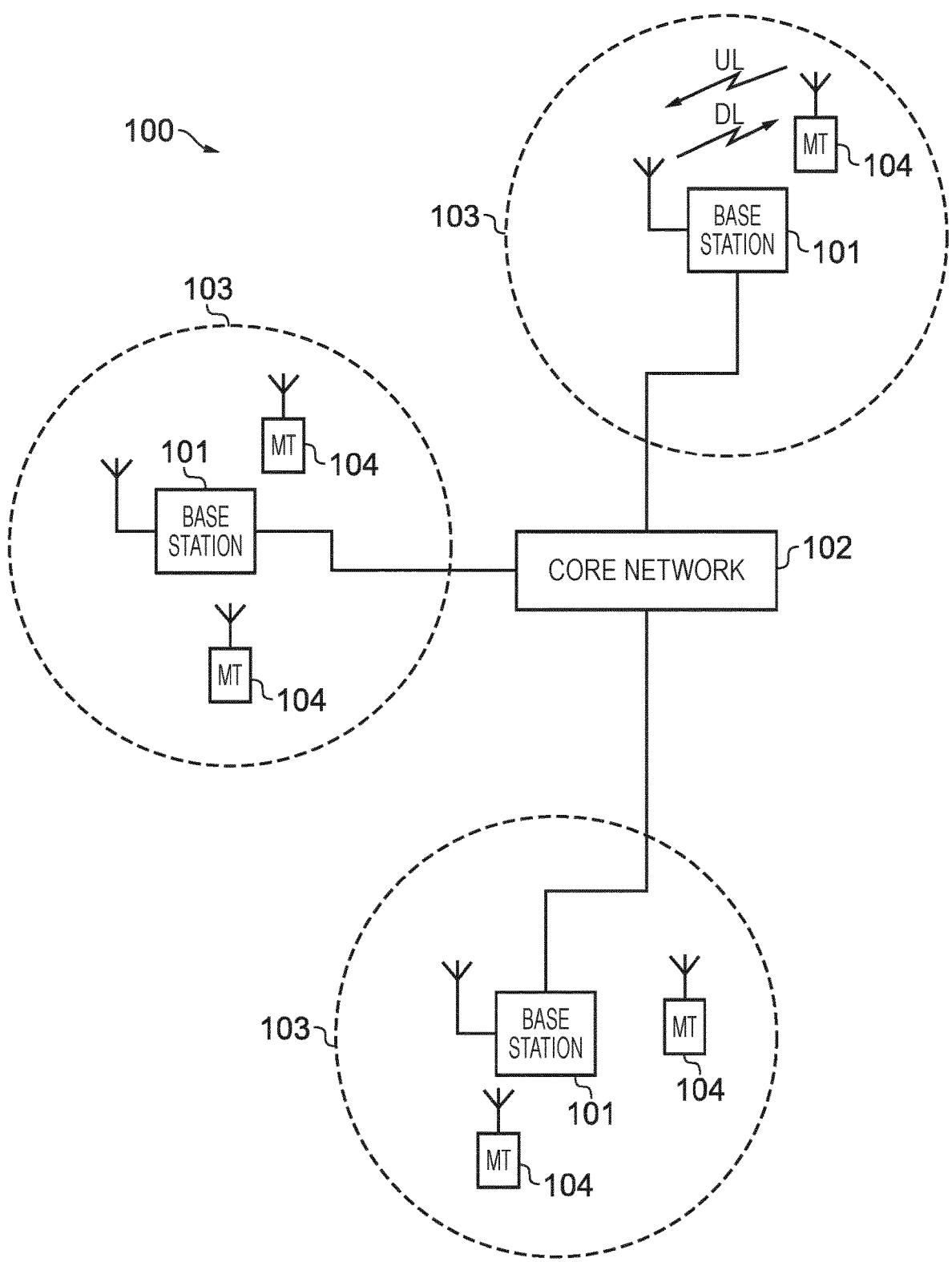
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
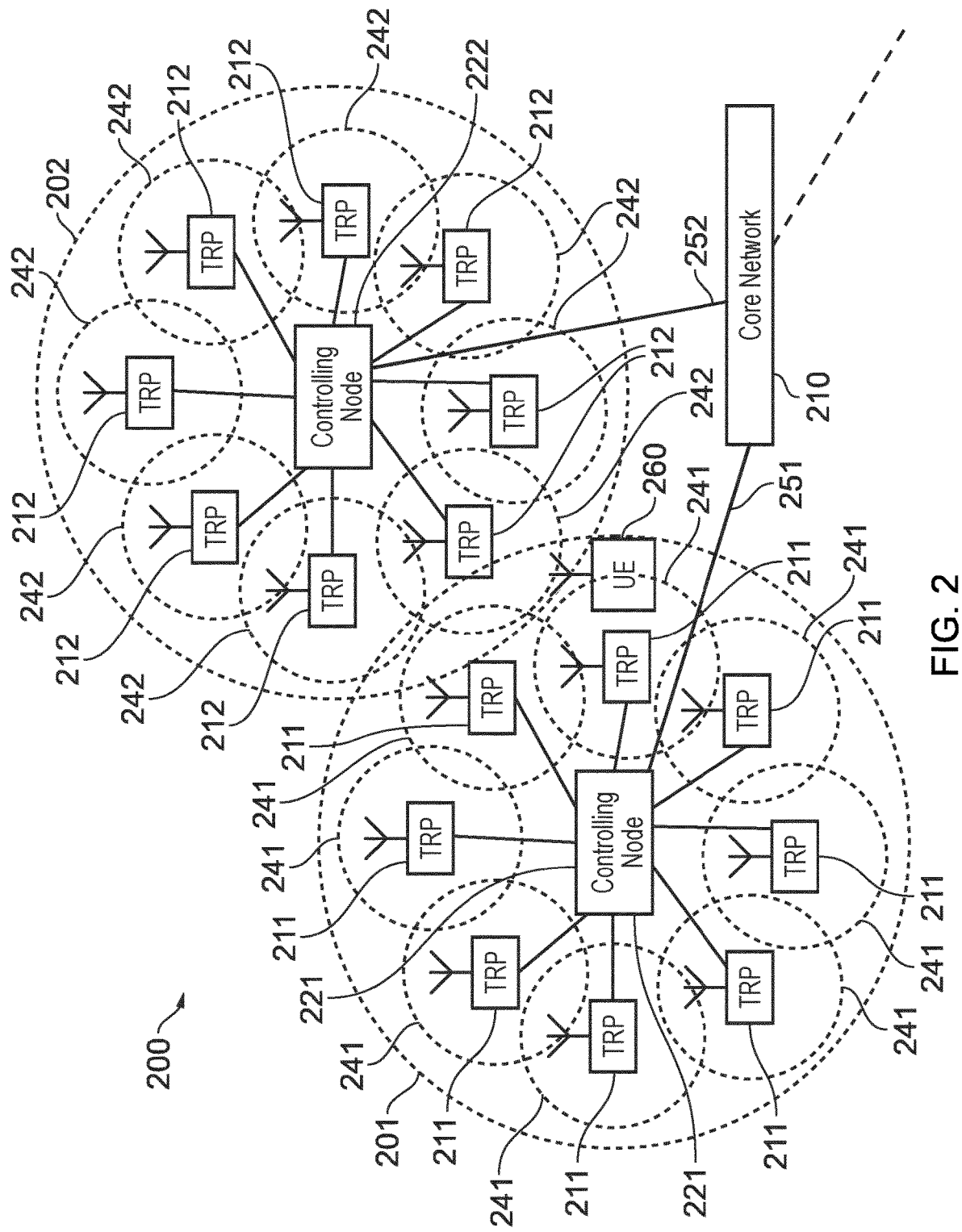
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases, communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
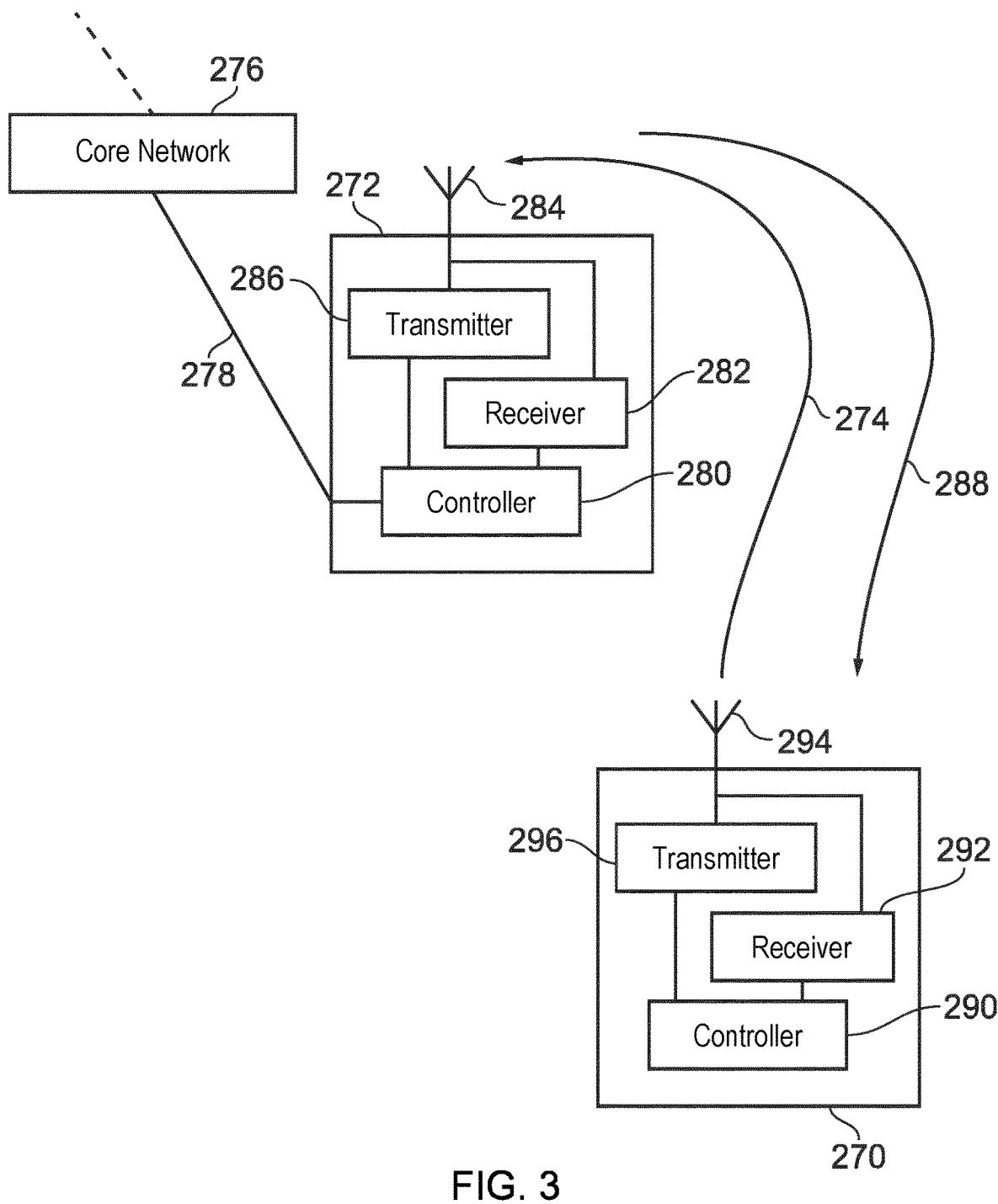
FIG. 3 is a schematic block diagram of an example infrastructure equipment and communications device configured in accordance with example embodiments.

A more detailed illustration of a communications device 270 and an example network infrastructure equipment 272, which may be thought of as a gNB 101 or a combination of a controlling node 221 and TRP 211, is presented in FIG. 3. As shown in FIG. 3, the communications device 270 is shown to transmit uplink data to the infrastructure equipment 272 of a wireless access interface as illustrated generally by an arrow 274. The UE 270 is shown to receive downlink data transmitted by the infrastructure equipment 272 via resources of the wireless access interface as illustrated generally by an arrow 288. As with FIGS. 1 and 2, the infrastructure equipment 272 is connected to a core network 276 (which may correspond to the core network 102 of FIG. 1 or the core network 210 of FIG. 2) via an interface 278 to a controller 280 of the infrastructure equipment 272. The infrastructure equipment 272 may additionally be connected to other similar infrastructure equipment by means of an inter-radio access network node interface, not shown on FIG. 3.

The infrastructure equipment 272 includes a receiver 282 connected to an antenna 284 and a transmitter 286 connected to the antenna 284. Correspondingly, the communications device 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the communications device 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, which may be non-volatile memory, operating according to instructions stored on a computer readable medium.

Two of the services defined in 5G are the Ultra-Reliable and Low Latency Communications (URLLC) and the enhanced Mobile BroadBand (eMBB) services. URLLC has very low latency and high reliability where a URLLC data packet (e.g. 32 bytes) is required to be transmitted from the radio protocol layer 2/3 SDU ingress point to the radio protocol layer 2/3 SDU egress point of the radio interface within 1 ms with a reliability of 99.999% [3] to 99.9999%. On the other hand, eMBB requires high data rate, e.g. 20 Gbps with moderate latency and reliability (e.g. 99% to 99.9%).

3GPP has recently completed a Rel-16 Work Item (WI) on eURLLC [4] which specifies features for high reliability and low latency services such as factory automation, transport industry, electrical power distribution, etc. in a 5G system. The eURLLC feature is further enhanced in a new Rel-17 WI [5] where one of the objectives is to enhance HARQ-ACK feedbacks for PDSCH transmissions.

Where communication resources are allocated by means of a dynamic grant, downlink control information is transmitted to the communications device to indicate the allocated communication resources and parameters for determining the uplink resources for transmitting acknowledgement information indicating whether the data transmitted using the allocated resources had been correctly received or not.

The uplink resources for transmitting acknowledgement information may be allocated on a physical uplink control channel (PUCCH).

The same PUCCH resources may be used for the transmission of acknowledgement information associated with multiple downlink transmissions.

Figure 4:
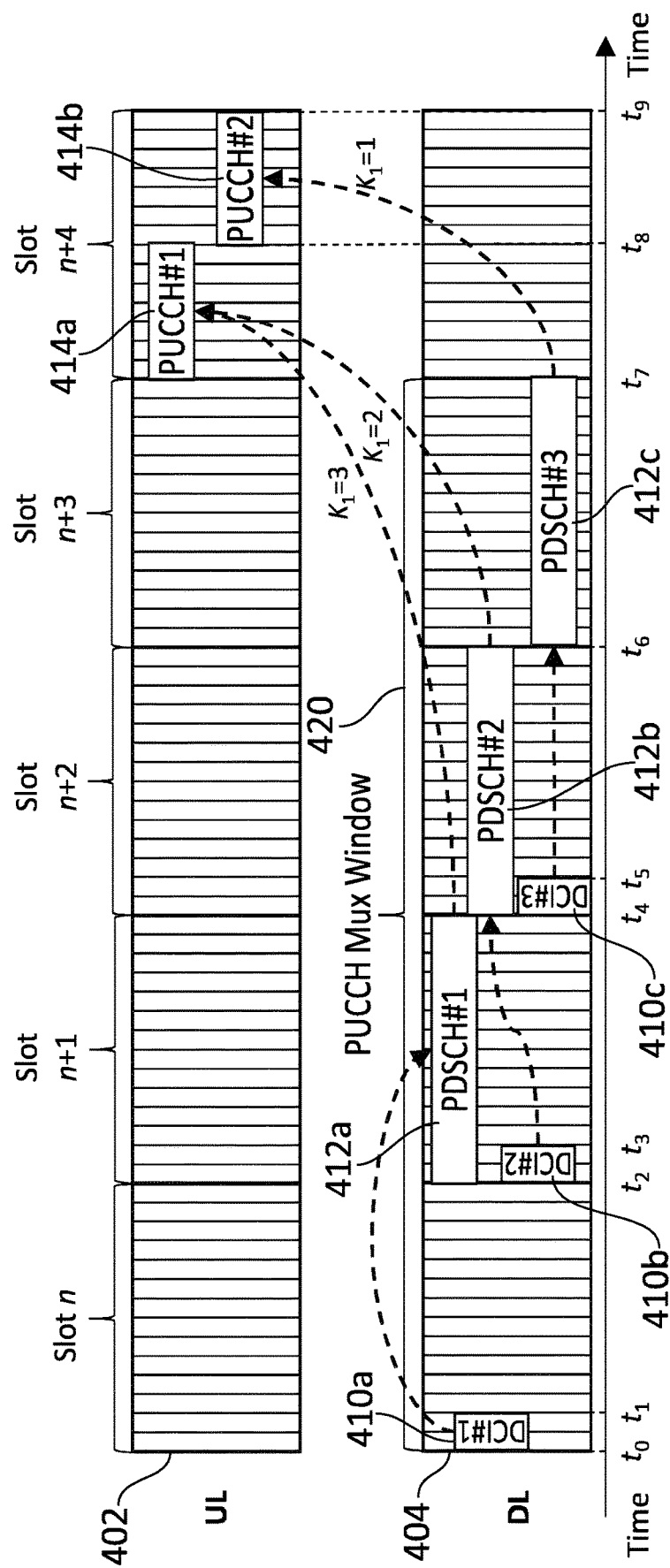
FIG. 4 illustrates the transmission of acknowledgement information associated with downlink transmissions, where the downlink transmissions use dynamically allocated communication resources, in accordance with conventional techniques.

FIG. 4 illustrates the transmission of acknowledgement information associated with downlink transmissions, where the downlink transmissions use dynamically allocated communication resources, in accordance with conventional techniques.

In FIG. 4, time progresses from left to right. Communication resources of a wireless access interface are shown, comprising downlink resources 404 and uplink resources 402. In the time domain, the communication resources are divided into timeslots (n, n+1, etc.), each timeslot comprising symbol periods. In the example of FIG. 4, each timeslot contains 14 symbol periods.

Downlink control information (DCI) 410a, 410b, 410c allocates corresponding downlink communication resources 412a, 412b, 412c. The downlink communication resources 412a, 412b, 412c are used for the transmission of data on physical downlink shared channels (PDSCH).

Each DCI comprises an indication of a value of a parameter K1. The K1 parameter indicates a timeslot offset between a timeslot in which the downlink PDSCH resources 412a, 412b, 412c end and a timeslot in which communication resources are allocated for the transmission of associated acknowledgement information. For example, the value of K1 may be indicated in a "PDSCH-to-HARQ_feedback timing indicator" field of the DCI indicating the downlink (DL) grant. The downlink grant may be encoded in accordance with a conventional DCI format, such as a DCI Format 1_0, DCI Format 1_1 or DCI Format 1_2.

In the example of FIG. 4, a first DCI 410a in slot n allocates first communication resources 412a which begin and end in slot n+1, and indicates a K1 value of 3. Accordingly, the acknowledgment information associated with the downlink transmission (i.e. indicating whether the data transmitted via the first communication resources 412a were correctly received and decoded) is to be transmitted in slot n+1+K1=n+4. Similarly, second and third DCIs 410b, 410c allocate respective second and third communication resources 412b, 412c, starting and ending in timeslots n+2 and n+3 respectively, and indicate K1 values of 2 and 1, respectively. Accordingly, a communications device is able to determine that acknowledgment information associated with the second and third downlink transmissions in second and third communication resources 412b, 412c is also to be transmitted in slot n+4.

In accordance with conventional techniques, acknowledgement information may be transmitted as part of a hybrid automatic repeat-request acknowledgement (HARQ) process.

In the present disclosure, the term 'HARQ-ACK' (hybrid automatic repeat-request acknowledgement) is used to refer to a portion of acknowledgement information associated with downlink communication resources. The portion of acknowledgement information may indicate whether any data transmitted via a single instance of downlink communication resources has been correctly received and decoded. It will be appreciated that the techniques disclosed herein are applicable when acknowledged data transmission is carried out other than by means of a HARQ technique. In the example of FIG. 4, there may be three separate HARQ-ACKs, one each associated with the first to third downlink communication resources 412a, 412b, 412c. Where no multiplexing is carried out (as described further below), a HARQ-ACK may comprise acknowledgement information which would have been sent using a single instance of allocated PUCCH resources. In some embodiments, a HARQ-ACK may be generated in respect of an instance of downlink communication resources (such as an instance of resources allocated by means of semi-persistent scheduling, as described further below) even if the instance was not used for the transmission of data to the communications device. Such a HARQ-ACK may indicate that no data was successfully received and decoded using the resource instance. Accordingly, an acknowledgement status may be associated with an instance of downlink communication resources, even if no data was in fact transmitted to the communications device. In some embodiments, a HARQ-ACK may indicate whether a data transmission was detected using the associated instance of downlink communication resources. In some embodiments, a HARQ-ACK may indicate whether, if a data transmission was detected, the data was successfully decoded.

The PUCCH resources within a timeslot may be indicated in a "PUCCH Resource Indicator" (PRI) field in the DL Grant. In the example of FIG. 4, the first and second DCIs 410a, 410b indicate first PUCCH resources 414a. The third DCI 410c indicates second PUCCH resources 414b.

In accordance with conventional techniques, such as those standardised in 3GPP Release 15, a communications device is permitted to transmit HARQ-ACKs using at most one PUCCH resource within any given timeslot, even if it has been allocated multiple PUCCH resources which do not overlap in time. This constraint may not apply to the use of further PUCCH resources for other purposes, such as transmitting a scheduling request.

The communications device may resolve this constraint by multiplexing the HARQ-ACKs, such that they may be sent using a single PUCCH resource instance. That is, the single PUCCH resource instance is used to transmit the multiple HARQ-ACKs. Multiplexing may comprise combining the HARQ-ACKs in a manner suitable for transmission using the single PUCCH resource instance. For example, this may comprise concatenating the acknowledgement information of the HARQ-ACKs.

A multiplexing window may be defined, whereby HARQ-ACKs may be multiplexed together only if they relate to downlink communications which occur within the multiplexing window. In the example of FIG. 4, the PUCCH multiplexing window 420 extends from, and includes, slot n to slot n+3. Because each of the first to third downlink communication resources 412a, 412b, 412c are within the multiplexing window 420, the communications device is permitted to multiplex their corresponding HARQ-ACKs.

The communications device may select the PUCCH resources based on the PRI indicated by the last (most recent) DCI which allocated downlink communication resources within the multiplexing window.

Accordingly, in the example of FIG. 4, the communications device selects the second PUCCH resources 414b, generates a multiplexed HARQ-ACK, based on the three HARQ-ACKs associated with the first to third downlink communication resources 412a, 412b, 412c, and transmits the multiplexed HARQ-ACK using the second PUCCH resources 414b within timeslot n+4 since the second PUCCH resources 414b were allocated by the last DCI 410c in the multiplexing window.

In accordance with conventional techniques, such as those standardised in 3GPP Release 16, the time domain may be further divided into sub-slots, where each timeslot containing a number (such as 2 or 7) of sub-slots. A communications device may be permitted to transmit HARQ-ACKs using more than one PUCCH resource within a timeslot, if the PUCCH resources occur within different sub-slots, and the HARQ-ACKs are in respect of eURLLC data. A K1 value indicated by a DCI may accordingly indicate a sub-slot in which a HARQ-ACK is to be transmitted.

Figure 5:
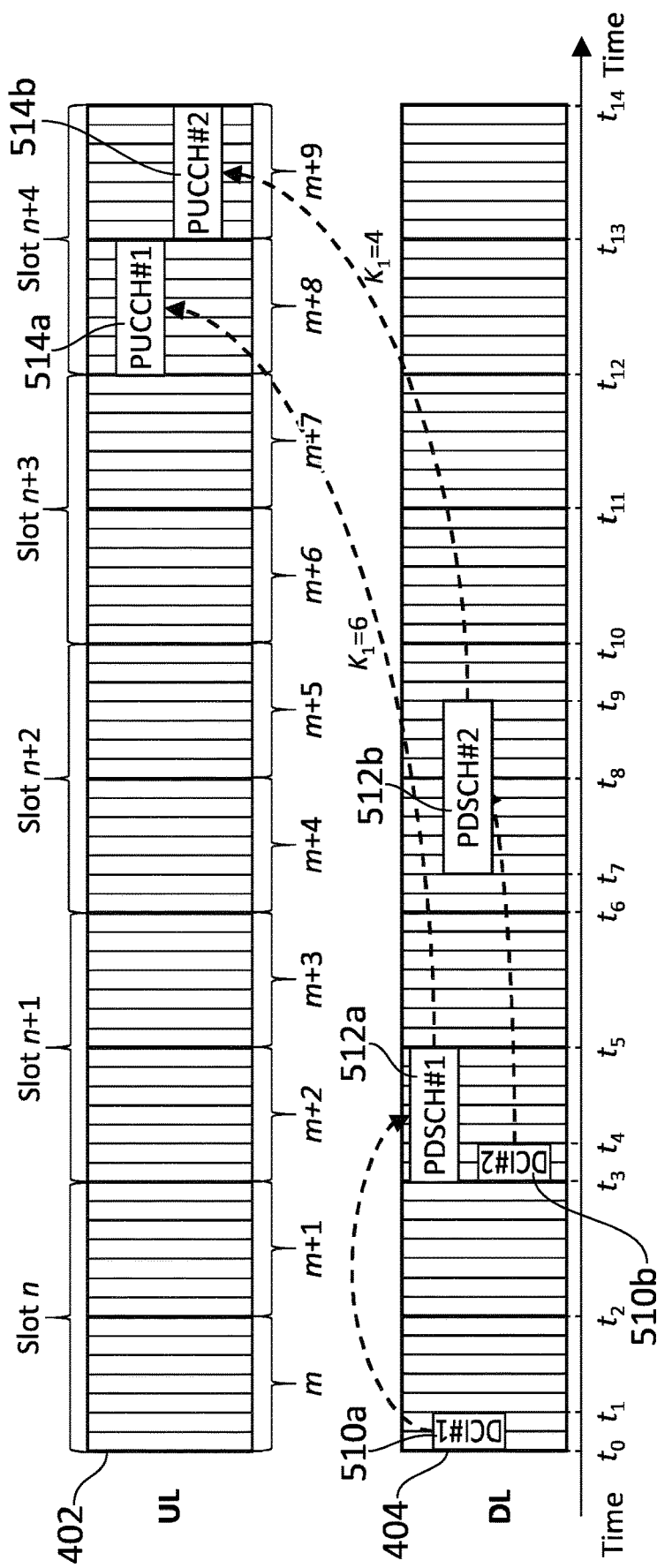
FIG. 5 illustrates the transmission of acknowledgement information associated with downlink transmissions of eURLLC data, where resources for the transmission of the acknowledgement information are allocated within a sub-slot, in accordance with conventional techniques.

FIG. 5 illustrates the transmission of acknowledgement information associated with downlink transmissions of eURLLC data, where resources for the transmission of the acknowledgement information are allocated within a sub-slot, in accordance with conventional techniques.

In the example of FIG. 5, there are two sub-slots, each of 7 symbol periods in duration, within each slot. The sub-slots are labelled m, m+1, m+2, etc.

The first DCI 510a allocates first downlink communication resources 512a and indicates that K1 has a value of 6. Because the first downlink communication resources 512a end in sub-slot m+2, the first HARQ-ACK is to be transmitted in first PUCCH resources 514a in sub-slot m+2+6=m+8. Similarly, the second DCI 510b allocates second downlink communication resources 512b and indicates that K1 has a value of 4. Because the second downlink communication resources 512b end in sub-slot m+5, the second HARQ-ACK is to be transmitted in second PUCCH resources 514b in sub-slot m+5+4=m+9. Because the first and second PUCCH resources 514a, 514b are in different sub-slots, the communications device is permitted to (and indeed, does) transmit respective HARQ-ACKs using the first and second PUCCH resources 514a, 514b.

Conventionally, semi-persistent scheduling (SPS) comprises the allocation of periodic communication resource instances for the transmission of data to, or by, a particular communications device. An indication of an SPS allocation may be transmitted using RRC configuration signalling. An SPS allocation may be subsequently activated or deactivated.

When activated, each instance (referred to herein as an SPS instance) of the SPS allocation is pre-allocated, and there is no need for a separate downlink grant to be transmitted for each instance. SPS can therefore permit efficient use of communication resources when data is to be transmitted periodically, and/or with very low latency and reduced control overhead.

A communications device or infrastructure equipment may not be required to transmit using every allocated SPS instance. However, in accordance with conventional techniques, a communications device may be required to transmit acknowledgement information in respect of each downlink SPS instance allocated for the transmission of data to the communications device, whether or not any such transmission occurred.

A particular downlink SPS allocation may allocate resources on a physical downlink shared channel (PDSCH), and accordingly, such an allocation and the corresponding sequence of SPS instances is referred to herein as an SPS PDSCH. It will be appreciated, however, that an SPS allocation may allocate resources on other channels.

In accordance with conventional techniques such as those specified in 3GPP Release 15 specifications, a communications device can be configured with at most one SPS PDSCH. After configuration, the SPS PDSCH may be activated by the transmission of an activation DCI by the infrastructure equipment to the communications device. An activation DCI may be encoded in accordance with a conventional DCI Format 1_0 or DCI Format 1_1. The SPS PDSCH may be deactivated by the transmission of a deactivation DCI by the infrastructure equipment to the communications device. A cyclic redundancy check (CRC) of an activation DCI and a deactivation DCI may be scrambled with an identifier associated with the SPS PDSCH, such as a CS radio network temporary identity (CS-RNTI).

The communications device may be required to transmit acknowledgement information to confirm the receipt of a deactivation DCI. On the other hand, no acknowledgement information may be required to confirm the receipt of an activation DCI.

The activation DCI may comprise a PDSCH-to-HARQ_feedback timing indicator which indicates the value of K1 for each subsequent instance of the SPS PDSCH, until the SPS PDSCH is deactivated. The K1 value applicable to instances of the SPS PDSCH can only be changed by deactivating, and subsequently activating, the SPS PDSCH, the subsequent activation being by means of a further activation DCI comprising an indication of the updated K1 value.

In accordance with the 3GPP Release 15 specifications, because a communications device can be configured with at most one SPS PDSCH, PUCCH formats which can carry at most 2 HARQ-ACKs (such as a PUCCH format 0 or a PUCCH format 1) may be used for the transmission of acknowledgement information associated with an SPS PDSCH instance. If it would not be possible to transmit the acknowledgement information (HARQ-ACK) because of a collision with a PUCCH allocation for the transmission of a HARQ-ACK associated with a PDSCH transmission which was dynamically granted (a "DG-PDSCH"), the SPS HARQ-ACK may be multiplexed with the conflicting HARQ-ACK, and transmitted using the PUCCH allocation for the transmission of a HARQ-ACK associated with the DG-PDSCH.

In accordance with conventional techniques such as those specified in 3GPP Release 16 specifications, a communications device can be configured with at most eight SPS PDSCHs. Each SPS PDSCH may be associated with an SPS Configuration Index, the mapping between SPS Configuration Index and SPS PDSCH being indicated by RRC configuration signalling.

Each SPS PDSCH may be individually activated using an activation DCI, the activation DCI comprising an indication of the associated SPS Configuration Index and an indication of the K1 value for that SPS PDSCH. Multiple SPS PDSCHs may be deactivated using a single deactivation DCI. As in Release 15, activation DCIs and deactivation DCIs may have their CRC scrambled with the CS-RNTI, and acknowledgment information is required to be transmitted only in response to receiving a deactivation DCI.

It may be the case that multiple HARQ-ACKs corresponding to different SPS PDSCH instances are to be sent within a same slot or sub-slot, based on the timing of the SPS PDSCH instances and the associated K1 values. In particular, the K1 values may be different for different SPS PDSCHs.

In such a scenario, the communications device may multiplex the conflicting HARQ-ACKs such that they may be transmitted using a single PUCCH instance. To allow such multiplexing, PUCCH Formats 2, 3, and 4 may be used (in addition to PUCCH Formats 0 and 1).

The ordering of the HARQ-ACKs in the multiplexed transmission may be in accordance with a predetermined sequence. For example, the order of the HARQ-ACKs may be based on the SPS PDSCH Configuration index of the corresponding SPS PDSCH instances, and (where multiple HARQ-ACKs are associated with the same SPS PDSCH) based on the slot in which the corresponding SPS PDSCH instances occurred. Since the K1 value may be fixed per SPS PDSCH, then it is unlikely that HARQ-ACKs associated with two or more SPS PDSCH having the same index would be multiplexed into a single PUCCH transmission.

Figure 6:
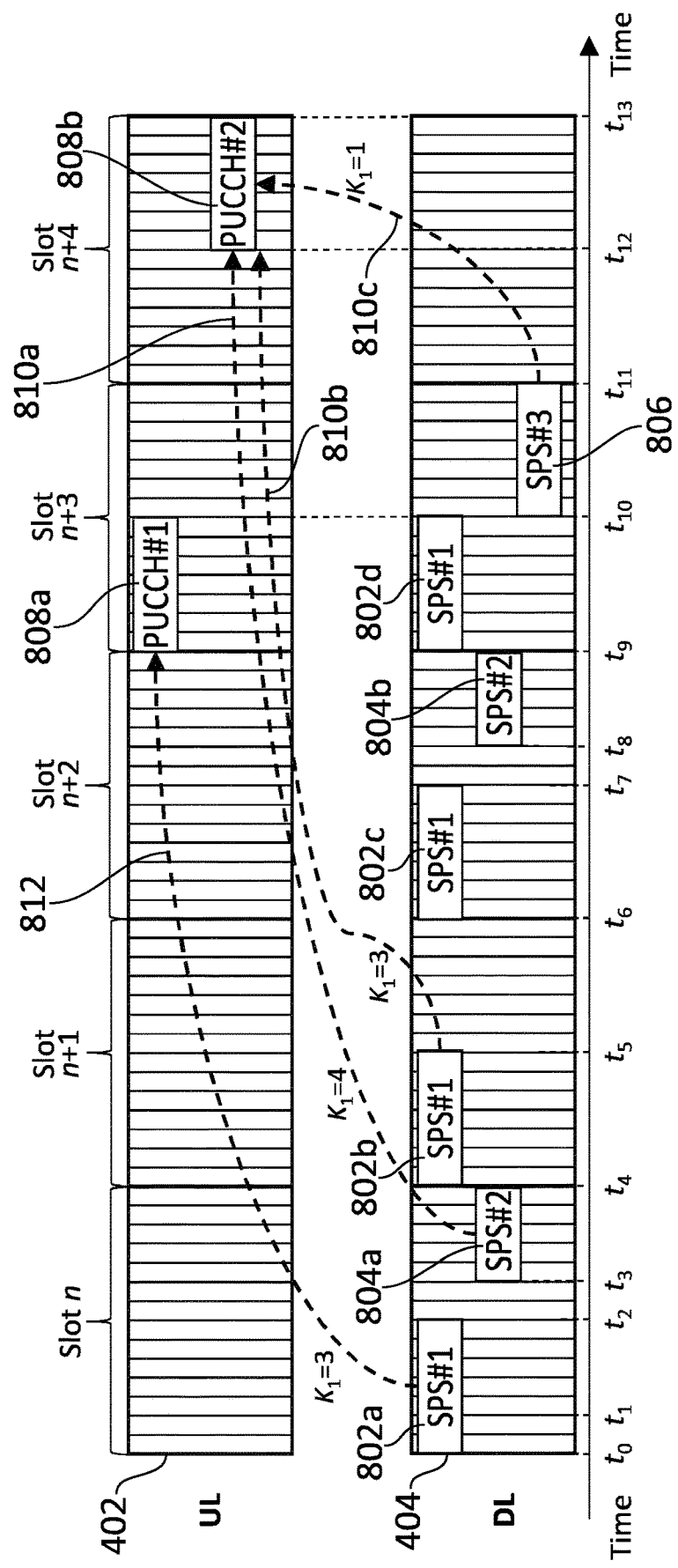
FIG. 6 shows the multiplexing of multiple portions of acknowledgement information associated with respective semi-persistent scheduling downlink communication resource instances within a single uplink communications resource instance, in accordance with conventional techniques.

FIG. 6 shows the multiplexing of multiple HARQ-ACKs associated with respective SPS PDSCH instances within a single PUCCH instance, in accordance with conventional techniques.

FIG. 6 shows SPS instances associated with three SPS PDSCHs, and two PUCCH instances.

Four instances 802a, 802b, 802c, 802d of a first SPS PDSCH having a K1 value of 3 are shown. Two instances 804a, 804b of a second SPS PDSCH having a K1 value of 4 are shown. A single instance 806 of a third SPS PDSCH having a K1 value of 1 is also shown. No SPS PDSCH instances occur prior to slot n; for example, each of the first to third SPS PDSCHs may have been activated such that their first instance occurred during, or after, slot n.

Based on the K1 value associated with the first SPS PDSCH, first PUCCH resources 808a in slot n+3 are allocated for the transmission of a HARQ-ACK associated with the first instance 802a of the first SPS PDSCH (which occurs in slot n). No other PUCCH resources are allocated for the transmission by the communications device of a HARQ-ACK for any other PDSCH instances during slot n+3. Accordingly, the communications device uses the first PUCCH resources 808a to transmit a HARQ-ACK associated with the first instance 802a of the first SPS PDSCH, as indicated by the dashed arrow 812.

Based on the K1 values of the associated SPS PDSCHs, PUCCH resources (such as the second PUCCH resources 808b) are allocated in slot n+4 for the transmission of HARQ-ACKs associated with the first instance 804a of the second SPS PDSCH (which occurs in slot n), the second instance 802b of the first SPS PDSCH (which occurs in slot n+1), and the first instance 806 of the third SPS PDSCH (which occurs in slot n+3).

HARQ-ACKs for each of these three instances are therefore multiplexed and transmitted using the second PUCCH resources 808b, as indicated by the dashed arrows 810a, 810b, 810c.

In the example of FIG. 4, FIG. 5 and FIG. 6, the wireless access interface operates in a frequency division duplex (FDD) manner, with separate communication resources 402, 404 (operating at different, non-overlapping, frequency ranges) for uplink (towards the infrastructure equipment) and downlink (by the infrastructure equipment), respectively. A wireless access interface may alternatively operate in a time division duplex (TDD) mode of operation. In TDD, communication resources within a single frequency range are used for uplink and downlink communications.

For example, where the communication resources are divided in time into slots, and each slot comprises a number of symbol periods, each symbol period may be designated for uplink use or for downlink use. In addition, in accordance with certain conventional techniques, a symbol period may be designated as 'invalid', that is, not available for either uplink or downlink transmission.

Accordingly, PUCCH resources determined according to the principles described above may occur during (or comprise) timeslots which are not designated as uplink timeslots. Such PUCCH resources cannot be used for the transmission of any HARQ-ACK, and thus acknowledgement information associated with an earlier PDSCH instance may be delayed or not transmitted.

Figure 7:
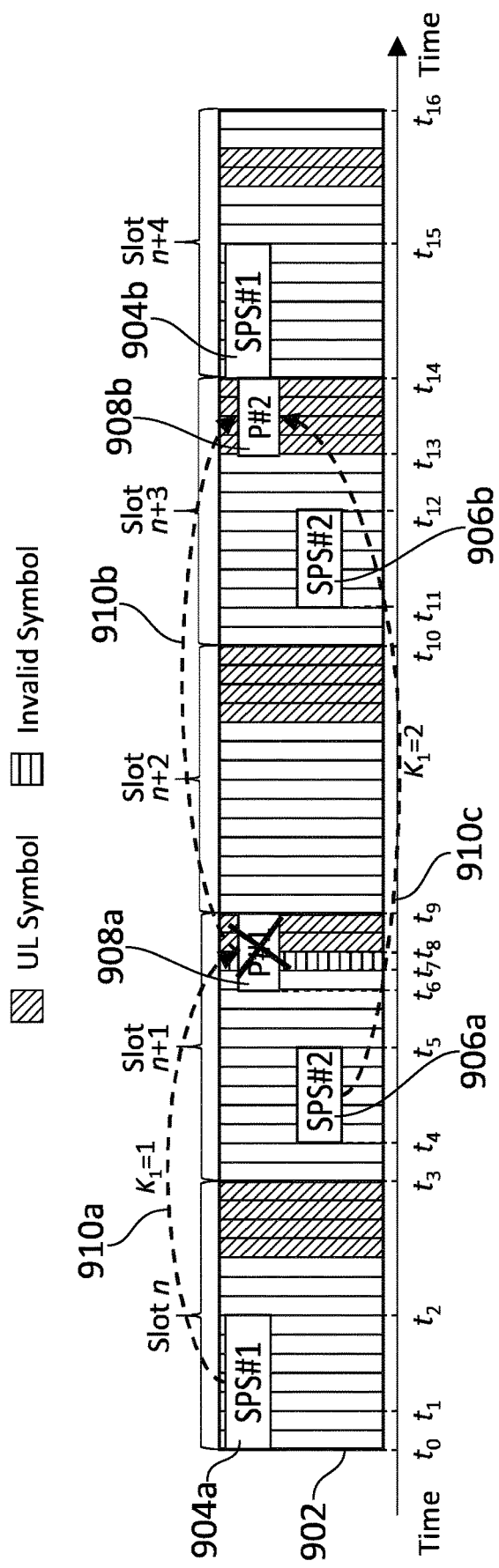
FIG. 7 shows the use of a subsequent allocation for the transmission of acknowledgement information which could not be transmitted in an earlier uplink resource allocation, because the earlier allocation comprised timeslots not designated for uplink transmission, in accordance with certain proposals.

FIG. 7 shows the use of a subsequent PUCCH allocation for the transmission of a HARQ-ACK which could not be transmitted in an earlier PUCCH allocation, because the earlier PUCCH allocation comprised timeslots not designated for uplink transmission, in accordance with certain proposals [6].

FIG. 7 shows communications resources 902 of a wireless access interface operating in TDD mode, the communication resources being divided in time into five slots (labelled n, n+1, . . . n+4), each slot comprising 14 symbol periods. Certain symbol periods (indicated by diagonal hatching) are designated as uplink symbols, and one symbol period (indicated by horizontal hatching) is designated as an invalid symbol. Other symbol periods are designated as downlink symbol periods.

Two instances 904a, 904b of a first SPS PDSCH are shown (in slots n and n+4), and two instances 906a, 906b of a second PDSCH are shown (in slots n+1 and n+3). The K1 value associated with the first SPS PDSCH is 1, and the K1 value associated with the second SPS PDSCH is 2.

According to the K1 value for the first SPS PDSCH, a first PUCCH instance 908a for the transmission of a HARQ-ACK associated with the first instance 904a of the first SPS PDSCH would occur in slot n+1. More specifically, in the example of FIG. 7, the first PUCCH instance 908a would occur from time t6 to time t9. The determination of the specific PUCCH resources may be based, for example, on the PRI associated with the first SPS PDSCH. However, the time period from time t6 to time t9 includes a downlink symbol (from time t6 to time t7) and an invalid symbol (from time t7 to time t8).

Accordingly, as indicated by the superimposed 'X', it is not possible for the communications device to transmit the HARQ-ACK during the first PUCCH instance 908a.

A second PUCCH instance 908b occurs in timeslot n+3, based on the first instance 906a of the second SPS PDSCH and its corresponding K1 value (2). The second PUCCH instance 908b spans the time period from t13 to t14, which corresponds to four symbol periods all of which are designated as uplink symbols. In accordance with some proposals, the second PUCCH instance 908b is used to transmit multiplexed HARQ-ACKs corresponding to the first instance 904a of the first SPS PDSCH and the first instance 906a of the second SPS PDSCH, as indicated by the dashed arrows 910a, 910b, 910c.

The proposals in [6], illustrated in FIG. 7, may lead to a large number of HARQ-ACKs being multiplexed into a single PUCCH transmission, if multiple earlier PUCCH allocations conflict with invalid or downlink time periods [7].

Figure 8:
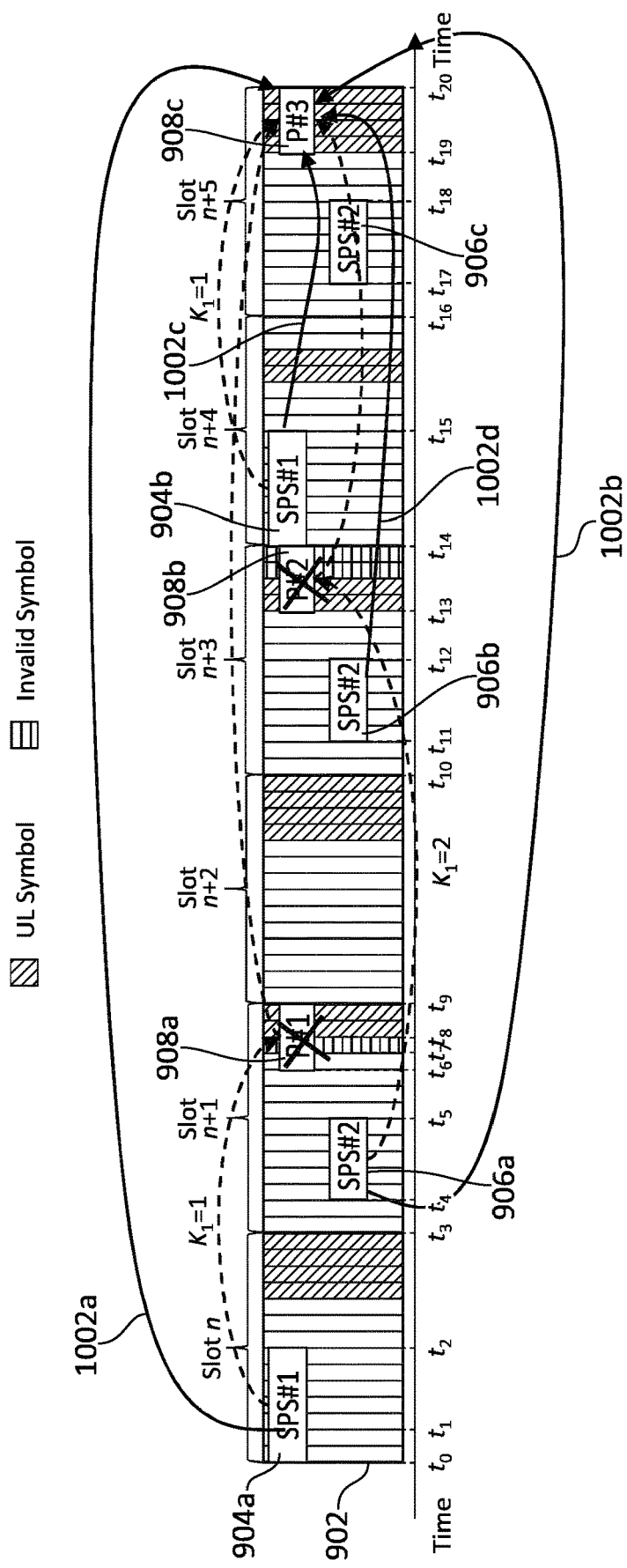
FIG. 8 shows a further example of the use of an allocation for the transmission of multiple portions of acknowledgement information which could not be transmitted in earlier allocations, because the earlier allocations comprised timeslots not designated for uplink transmission, in accordance with certain proposals.

FIG. 8 shows a further example of the use of a PUCCH allocation for the transmission of multiple HARQ-ACKs which could not be transmitted in earlier PUCCH allocations, because the earlier PUCCH allocations comprised timeslots not designated for uplink transmission, in accordance with certain proposals [6].

The example shown in FIG. 8 is similar to that shown in FIG. 7. Elements which are common to FIG. 7 and FIG. 8 are numbered with like reference numerals, and the description of them will not be repeated, for conciseness. In the example of FIG. 8, six timeslots (n, n+1, . . . n+5) are shown and a third instance 906c of the second SPS PDSCH is shown in timeslot n+5. A third PUCCH instance 908c is also shown in timeslot n+5.

As in the example of FIG. 7, the first PUCCH instance 908a conflicts with downlink and invalid symbol periods. However, in FIG. 8, the second PUCCH instance 908b also conflicts with invalid symbols. Accordingly, the communications device is unable to transmit HARQ-ACKs using the second PUCCH instance 908b, as indicated by the superimposed 'X'.

The third PUCCH instance 908c occurs in timeslot n+5. This is associated with the second instance 904b of the first SPS PDSCH in timeslot n+4. In accordance with certain proposals [6], all outstanding HARQ-ACKs are multiplexed and transmitted using the third PUCCH instance 908c. Herein, 'outstanding HARQ-ACKs' includes those HARQ-ACKs which, at the time of a valid PUCCH under consideration, would have been transmitted in an earlier PUCCH instance but were not, because the earlier PUCCH instance was invalid.

In some embodiments disclosed herein, where the valid PUCCH is allocated for the transmission of one or more HARQ-ACKs (which would not, in any case, have been transmitted in any earlier PUCCH instance), those one or more HARQ-ACKs (such as the HARQ-ACKs associated with the second instance 904b of the first SPS PDSCH and the second instance 906b of the second SPS PDSCH in the example of FIG. 8) may also be considered as 'outstanding HARQ-ACKs' for the purpose of the present disclosure.

This is the case in the example of FIG. 8, and the outstanding HARQ-ACKs are accordingly those associated with the first and second instances 904a, 904b of the first SPS PDSCH and with the first and second instances 906a, 906b of the second SPS PDSCH. The multiplexing and transmission of the outstanding HARQ-ACKs using the third PUCCH instance 908c, is indicated by the arrows 1002a, 1002b, 1002c, 1002d.

The inventors of the present technique have recognised that the principle of multiplexing all outstanding (i.e. not yet transmitted) HARQ-ACKs into a single PUCCH instance has several disadvantages. For example, the communication resources associated with the single PUCCH instance may be insufficient to transmit all such HARQ-ACKs. It may not be possible to encode the multiplexed HARQ-ACKs in a manner that they can be transmitted within the single PUCCH instance with a required reliability (e.g. probability of correct reception and decoding).

There thus arises a technical problem of transmitting HARQ-ACKs when PUCCH resources may not be available or suitable.

Proposals ([7],[8]) have been made to provide a set of K1 values for an SPS PDSCH such that the PUCCH carrying the corresponding HARQ-ACK can use one of these K1 values to determine its time resource. For example, in [7], it is suggested that each SPS PDSCH occasion of an SPS PDSCH configuration uses a K1 value according to the order in the set of K1 values, for example, if the set is K1={3, 4, 4, 2} then the first SPS PDSCH occasion uses K1=3, the 2nd SPS PDSCH occasion uses K1=4, the 3rd SPS PDSCH occasion uses K1=4, the 4th SPS PDSCH occasion uses K1=2 and the cycle is repeated for following SPS PDSCH occasions. In [8], it is proposed that the SPS PDSCH will use the first K1 values in the set that has an available PUCCH (i.e. one that did not collide with a DL symbol or an Invalid symbol).

However, these methods do not address the technical problem that an accumulation of outstanding HARQ-ACKs could in any case arise.

Embodiments of the present technique can provide a method of transmitting acknowledgement information, the method comprising receiving from an infrastructure equipment of a wireless communications network an indication of a plurality of instances of downlink communications resources associated with a semi-persistent resource allocation, the plurality of instances of downlink communications resources allocated for the transmission of data by the infrastructure equipment to the communications device via a wireless access interface, determining that one or more uplink communication resources allocated for the transmission of a portion of acknowledgement information indicating an acknowledgement status of a respective instance of the downlink communication resources is invalid and cannot be used for the transmission of the acknowledgement information, selecting, from a plurality of outstanding portions of acknowledgement information which have not been transmitted, a subset of portions of acknowledgement information, and transmitting to the infrastructure equipment the selected subset of portions of acknowledgement information using a single instance of uplink communication resources.

Embodiments of the present technique can thus ensure that resources which can be used for the transmission of one or more HARQ-ACKs are used for the transmission of an appropriate number of such HARQ-ACKs. Some embodiments of the present technique can provide, where not all outstanding HARQ-ACKs can be multiplexed for transmission using the PUCCH resources, means for selecting, from the outstanding HARQ-ACKs, those which are to be multiplexed and transmitted using available PUCCH resources.

In some embodiments, the outstanding HARQ-ACKs are first filtered according to criteria.

In some embodiments, outstanding HARQ-ACKs (which satisfy any applicable filter criteria) are selected in a priority order.

In some embodiments, outstanding HARQ-ACKs (which satisfy any applicable filter criteria) are selected subject to predetermined criteria which may prevent all HARQ-ACKs from being selected.

Outstanding HARQ-ACKs which satisfy any applicable filter criteria and are selected, subject to any predetermined criteria, may be multiplexed and transmitted using a valid PUCCH resource instance.

In some embodiments, the valid PUCCH resource instance is associated with downlink communication resources, and acknowledgement information relating to the data transmitted using those downlink communication resources is selected for transmission using the valid PUCCH resource instance, without regards to filter criteria, priority order or any other predetermined criteria.

In the present disclosure, an 'invalid PUCCH' is used to refer to an instance of PUCCH resources which cannot be used for the transmission of any HARQ-ACKs, due to, for example, a collision or overlap with communication resources which are designated as invalid or for downlink transmission. Conversely, a 'valid PUCCH' refers to an instance of PUCCH resources that can be used for the transmission of one or more HARQ-ACKs. Accordingly, a valid PUCCH does not collide with, or overlap communication resources which are designated as invalid or for downlink transmission.

The term 'outstanding HARQ-ACK' is used to refer to a HARQ-ACK which has not yet been transmitted. A HARQ-ACK may be outstanding because resources which were allocated for its initial transmission were in fact invalid. For example, referring to FIG. 8, PUCCH resources 908a were initially allocated for the transmission of a HARQ-ACK associated with the SPS PDSCH instance 904a. However, because the PUCCH resources 908a are invalid, the HARQ-ACK associated with the SPS PDSCH instance 904a is not transmitted and is thus an 'outstanding' HARQ-ACK.

In accordance with some embodiments, a valid PUCCH instance may be used to transmit one or more HARQ-ACKs, including one or more which are outstanding because of an earlier invalid PUCCH allocation. In some embodiments, it may not be possible to transmit all outstanding HARQ-ACKs using a valid PUCCH allocation. In some such embodiments, outstanding HARQ-ACKs which are not transmitted may remain as 'outstanding HARQ-ACKs'. For example, as will be disclosed further below, in some embodiments, filter criteria may be applied which preclude the transmission of an outstanding HARQ-ACK using a valid PUCCH instance. Such a HARQ-ACK may be considered an outstanding HARQ-ACK when considering a later valid PUCCH instance.

When considering a plurality of PUCCH instances, a 'latest' PUCCH is the instance of PUCCH which occurs latest in time of the plurality of PUCCH instances.

In some embodiments, only a certain number ($N_{HARQ}$) of outstanding HARQ-ACKs may be multiplexed and transmitted using a valid PUCCH.

If an outstanding HARQ-ACK is selected for transmission and the number of selected HARQ-ACKs does not exceed $N_{HARQ}$, then additional HARQ-ACKs may be considered for selection.

In some embodiments, $N_{HARQ}$ is determined based on (for example, is equal to) a number of outstanding HARQ-ACKs that would have been transmitted in a predetermined number of most recent earlier invalid PUCCH instances, if those (that number of) earlier invalid PUCCH instances were valid. Accordingly, the outstanding HARQ-ACKs may include those which would have been transmitted using a PUCCH prior to (and not within) the number of earlier invalid PUCCH instances.

In some embodiments, $N_{HARQ}$ is determined based on (for example, is equal to) a number of outstanding HARQ-ACKs that would have been transmitted in a predetermined number of most recent earlier invalid PUCCH instances, if all earlier PUCCH instances (including the number of PUCCH instances) were valid. Accordingly, the outstanding HARQ-ACKs may not include those which would have been transmitted using a PUCCH prior to (and not within) the number of earlier invalid PUCCH instances.

In some embodiments, the number of most recent earlier invalid PUCCH instances is one.

In some embodiments, the value of $N_{HARQ}$ is indicated in a message transmitted by the infrastructure equipment, such as in RRC configuration signalling or DCI signalling. In some embodiments, $N_{HARQ}$ is predetermined. The value of $N_{HARQ}$ may be specified in an appropriate standards specification.

In some embodiments, an outstanding HARQ-ACK may be selected for transmission using a valid PUCCH, only if the resulting code rate, when all selected HARQ-ACKs for that PUCCH are encoded, does not exceed a target code rate $R_{UCI}$. If an outstanding HARQ-ACK is selected for transmission and the target code rate $R_{UCI}$ is not exceeded, then additional HARQ-ACKs may be considered for selection.

The value of $R_{UCI}$ may be determined based on an indication within RRC signalling (e.g. within an RRC configuration message transmitted by the infrastructure equipment) or within a DCI. The DCI may be the activation DCI which activates an SPS PDSCH, where the valid PUCCH is allocated for the transmission of a HARQ-ACK associated with an instance of that SPS PDSCH. The DCI may also be the DCI scheduling a Dynamic Grant PDSCH where the corresponding PUCCH is the valid PUCCH.

In some embodiments, where there are outstanding HARQ-ACKs which cannot be selected for transmission using a valid PUCCH, those not transmitted using the valid PUCCH may be dropped (i.e. not transmitted and no longer considered as outstanding HARQ-ACKs), may remain as outstanding HARQ-ACKs, or may be otherwise transmitted subsequently.

In some embodiments, the infrastructure equipment may determine that not all outstanding HARQ-ACKs were transmitted using a particular valid PUCCH, and may allocate (for example, by means of a DCI) uplink resources for the transmission of the HARQ-ACKs.

In some embodiments, the communications device may transmit one or more of the HARQ-ACKs which were not transmitted using the valid PUCCH using a random access channel (e.g. a physical random access channel, PRACH).

FIG. 9A and FIG. 9B show the selection of outstanding HARQ-ACKs for multiplexing and transmission using a single valid PUCCH, in accordance with embodiments of the present technique.

In the example of FIG. 9A and FIG. 9B, three SPS PDSCHs are configured.

A first instance 1104 of the first SPS PDSCH occurs in timeslot n. The associated value of K1 is 2. First and second instances 1106a, 1106b of the second SPS PDSCH occur in timeslot n+1 and timeslot n+5. The associated value of K1 is 2. First and second instances 1108a, 1108b of the third SPS PDSCH occur in timeslot n and timeslot n+4. The associated value of K1 is 1.

First, second, third and fourth PUCCH instances 1110a, 1110b, 1110c, 1110d occur in timeslots n+1, n+2, n+3 and n+5. However, of these, only the fourth PUCCH instance 1110d is a valid PUCCH, as the first, second and third PUCCH instances 1110a, 1110b, 1110c overlap symbol periods designated as invalid symbols.

First to fourth candidate HARQ-ACKs 1112a-d for selection for transmission using the valid PUCCH instance 1110d are shown in FIG. 9B, represented by boxes. The PDSCH instance whose acknowledgement status is indicated by a HARQ-ACK is indicated by the dashed arrows. First HARQ-ACK 1112a indicates the acknowledgement status of data (if any) transmitted using the first instance 1104 of the first SPS-PDSCH. Second and fourth HARQ-ACKs 1112b, 1112d indicate the acknowledgement status of data (if any) transmitted using the first and second instances 1108a, 1108b of the third SPS-PDSCH, and third HARQ-ACK 1112c indicates the acknowledgement status of data (if any) transmitted using the first instance 1106a of the second SPS-PDSCH.

Also shown in FIG. 9B are the start and end times of the PUCCH instances which, if those PUCCH instances were not invalid, would have been used to transmit each of the first to fourth HARQ-ACKs 1112a-d. For example, the first HARQ-ACK 1112a would have been transmitted using the second PUCCH instance 1110b, which extends from time t10 to time t12, if the second PUCCH instance 1110b were not invalid. Because the first to third PUCCH instances 1110a, 1110b, 1110c are invalid, then in addition to the further HARQ-ACK 1112d, the first to third HARQ-ACKs 1112a, 1112b, 1112c are also outstanding HARQ-ACKs for the purpose of selecting HARQ-ACKs to be multiplexed and transmitted using the fourth PUCCH instance 1110d.

In accordance with embodiments of the present technique, the HARQ-ACKs are selected according to the time of the PUCCH instance when they would have been transmitted, if no PUCCH instances were invalid, starting from the most recent PUCCH instance.

In some embodiments, the HARQ-ACK which would have been transmitted using the valid PUCCH instance if no PUCCH instances were invalid (referred to herein as the HARQ-ACK associated with the valid PUCCH instance) is always selected for transmission using the valid PUCCH.

In the example of FIG. 9A and FIG. 9B, however, this is not the case and the HARQ-ACK associated with the valid PUCCH instance is considered in sequence order along with the other outstanding HARQ-ACKs.

Accordingly, in the example of FIG. 9A and FIG. 9B, the outstanding HARQ-ACKs are considered in the following order: the fourth HARQ-ACK 1112d, the third HARQ-ACK 1112c, the first HARQ-ACK 1112a, and the second HARQ-ACK 1112b.

In the example of FIG. 9A and FIG. 9B, the criteria for not selecting a further outstanding HARQ-ACK are satisfied after the selection of the first HARQ-ACK 1112a, and accordingly the second HARQ-ACK 1112b is not multiplexed and included in the transmission using the valid PUCCH instance 1110d. The fourth HARQ-ACK 1112d, the third HARQ-ACK 1112c, and the first HARQ-ACK 1112a are multiplexed and encoded, and transmitted using the valid PUCCH instance 1110d.

As described elsewhere herein, in some embodiments, the criteria for not selecting a further outstanding HARQ-ACK are satisfied when a predetermined number $N_{HARQ}$ HARQ-ACKs have been selected. In some embodiments, the criteria for not selecting a further outstanding HARQ-ACK are satisfied when the selection of the next in order HARQ-ACK would result in a code rate exceeding a predetermined value.

In the example of FIG. 9A and FIG. 9B, the order for selection of outstanding HARQ-ACKs is based on the relative times of PUCCH instances which would have been used to transmit the HARQ-ACKs, had the PUCCH instances been valid.

In some embodiments, the order for selection of outstanding HARQ-ACKs is based on the relative times of SPS PDSCH instances whose acknowledgement status is indicated by the HARQ-ACKs.

Figure 10A:
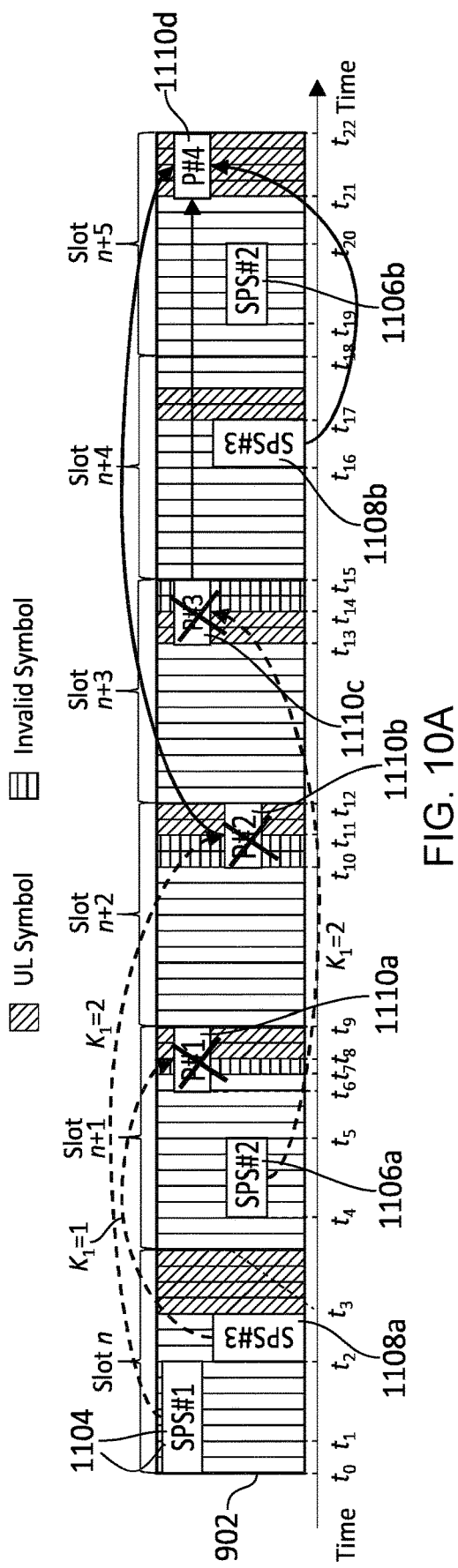
FIG. 10A and FIG. 10B show the selection of outstanding portions of acknowledgement information for multiplexing and transmission using a single valid communications resource allocation, in accordance with embodiments of the present technique.
Figure 10B:
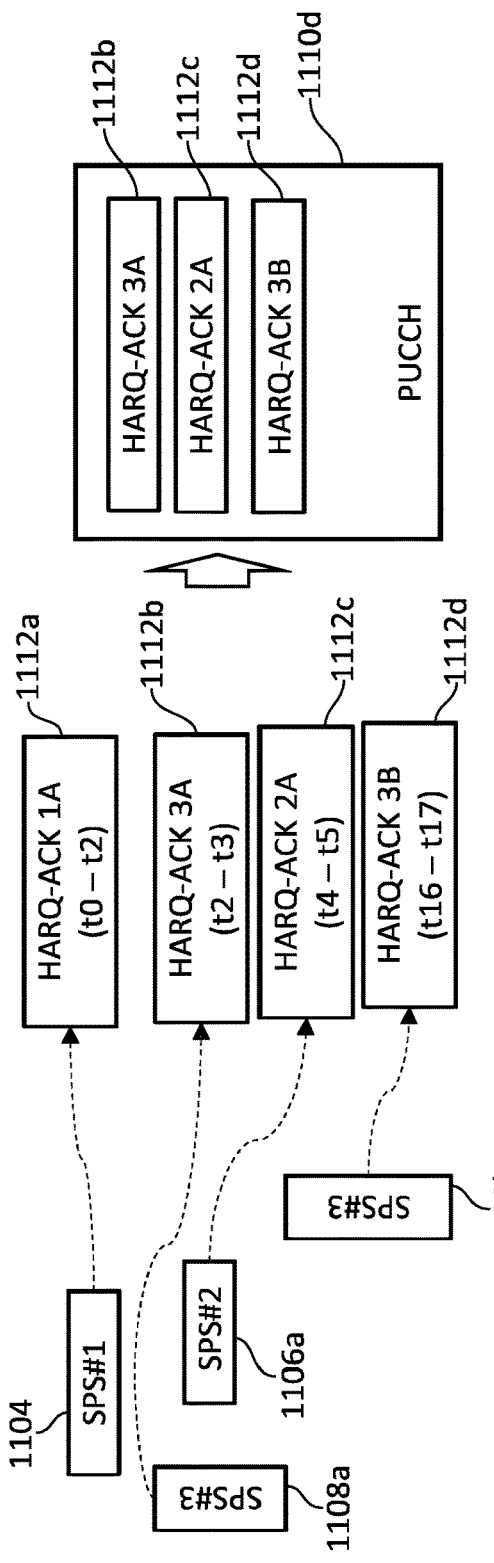

FIG. 10A and FIG. 10B show the selection of outstanding HARQ-ACKs for multiplexing and transmission using a single valid PUCCH, in accordance with embodiments of the present technique.

In the example of FIG. 10A and FIG. 10B, the SPS PDSCHs are configured as in the example of FIG. 9A, and SPS PDSCH instances and PUCCH instances occur as in the example of FIG. 9A. Similarly, as in FIG. 9A, the first to third PUCCH instances 1110a, 1110b, 1110c are invalid.

FIG. 10B shows the selection of the outstanding HARQ-ACKs 1112a-1112d for transmission using the valid PUCCH instance 1110d. However, unlike FIG. 9B, the times shown as associated with each HARQ-ACK are the transmission times of the SPS PDSCH instances used for the transmission of data (if any) whose acknowledgement status is indicated by the respective HARQ-ACK.

In the example of FIG. 10A and FIG. 10B, the HARQ-ACK associated with the valid PUCCH instance (in this case, the fourth HARQ-ACK 1112d) is automatically selected and is not considered when determining if the criteria based on $N_{HARQ}$ are satisfied.

The remaining outstanding HARQ-ACKs are considered in order of the timing of the associated SPS PDSCH instance, starting with the most recent. Accordingly, the remaining outstanding HARQ-ACKs are considered in the following order: the third HARQ-ACK 1112c, the second HARQ-ACK 1112b, and the first HARQ-ACK 1112a.

In the example of FIG. 10A and FIG. 10B, the value of $N_{HARQ}$ is two, and thus as shown in FIG. 10B, only the third HARQ-ACK 1112c and the second HARQ-ACK 1112b are selected for multiplexing and transmission using the valid PUCCH instance 1110d. Because the fourth HARQ-ACK 1112d is automatically selected, it is also multiplexed and transmitted using the valid PUCCH instance 1110d.

As described above, multiple HARQ-ACKs may be multiplexed into a single PUCCH transmission, irrespective of whether PUCCH instances are valid or invalid. This may be because, for example, based on the respective K1 values associated with two or more SPS PDSCH instances, the PUCCH instances allocated for the SPS PDSCH instances occur within the same timeslot or sub-slot.

When the single PUCCH instance is invalid, the multiple HARQ-ACKs become outstanding HARQ-ACKs which are candidates for selection for multiplexing in a subsequent valid PUCCH instance. Where it is not possible to multiplex all these outstanding HARQ-ACKs into the subsequent valid PUCCH instance, it is necessary to select a subset for multiplexing.

In some embodiments of the present technique, where multiple outstanding HARQ-ACKs would have been transmitted using a single PUCCH instance, but were not because the PUCCH instance is invalid, a subset of the multiple outstanding HARQ-ACKs is selected, based on the timing of the associated SPS PDSCH instances. In some embodiments, a first outstanding HARQ-ACK is selected in preference to a second outstanding HARQ-ACK, if the associated SPS PDSCH instance associated with the first outstanding HARQ-ACK occurs later than the associated SPS PDSCH instance associated with the second outstanding HARQ-ACK.

FIG. 11A and FIG. 11B show the selection of outstanding HARQ-ACKs for multiplexing and transmission using a single valid PUCCH, in accordance with embodiments of the present technique, when two or more of the outstanding HARQ-ACKs would have been transmitted using a single PUCCH instance which was invalid.

In the example of FIG. 11A and FIG. 11B, one instance 1304 of a first SPS PDSCH occurs in slot n, the first SPS PDSCH having a K1 value of 3. Three instances 1306a, 1306b, 1306c of a second SPS PDSCH occur in slots n+1, n+3 and n+5, the second SPS PDSCH having a K1 value of 2. Two instances 1308a, 1308b of a third SPS PDSCH occur in slots n and n+4, the third SPS PDSCH having a K1 value of 3.

A first PUCCH instance 1310a occurs in slot n+3. If this were a valid PUCCH instance, it would be used for transmitting multiplexed HARQ-ACKs indicating the acknowledgement status of the first instance 1304 of the first SPS PDSCH, of the first instance 1306a of the second SPS PDSCH, and of the first instance 1308a of the third SPS PDSCH. In some embodiments, this may be because the PRIs associated with the first, second and third SPS PDSCHs all indicate the same resource. In some embodiments, the first PUCCH instance 1310a may be selected from multiple PUCCH resources, based on a selection algorithm applied to PUCCH resources allocated for the transmission of HARQ-ACKs for the first, second and third SPS PDSCHs.

Because the first PUCCH instance 1310a comprises communication resources designated as invalid (specifically, from time t16 to time 17), no HARQ-ACKs are transmitted using the first PUCCH instance 1310a.

The next PUCCH instance allocated for the transmission of HARQ-ACKs by the communications device is the second PUCCH instance 1310b which occurs in slot n+5.

FIG. 11B shows the outstanding HARQ-ACKs (1312a, 1312b, 1312c) from which the HARQ-ACKs to be selected for multiplexing and transmission using the second PUCCH instance 1310b are to be selected, and (by means of dashed arrows) the SPS PDSCH instances whose acknowledgement status they indicate.

The times indicated for each of the HARQ-ACKs are those of the respective associated SPS PDSCH instances.

In the example of FIG. 11A and FIG. 11B, the second PUCCH instance 1310b is allocated for the transmission of a HARQ-ACK ("HARQ-ACK 2B" 1312d) indicating the acknowledgement status of the second instance 1306b of the second SPS PDSCH, and is automatically selected (i.e. selected with highest priority) for transmission using the second PUCCH instance 1310b. In this example the HARQ-ACK 2B 1312d is therefore not considered an 'outstanding HARQ-ACK' when assessing whether the criteria (based on $N_{HARQ}$) are satisfied.

In the example of FIG. 11A and FIG. 11B, the value of $N_{HARQ}$ is 2. In accordance with some embodiments of the present technique, the subset of HARQ-ACKs is ranked based on the timing of the associated SPS PDSCH instances, starting with the most recent (latest). HARQ-ACKs are selected in order of ranking, and included if the applicable criteria (in the example of FIG. 11A and FIG. 11B that the number of outstanding HARQ-ACKs included does not exceed $N_{HARQ}$) is satisfied.

If a HARQ-ACK cannot be included without satisfying the criteria, or there are no further outstanding HARQ-ACKs to consider, then the process stops and no further HARQ-ACKs are considered.

Accordingly, the second HARQ-ACK 1312b and third HARQ-ACK 1312c are selected for multiplexing and transmission using the valid PUCCH instance 1310b, complying with the limit of $N_{HARQ}=2$.

In the example of FIG. 9A and FIG. 9B, the ranking is based on the timing of the earlier invalid PUCCH instance allocated for the transmission of the HARQ-ACK. In the examples of FIG. 10A, FIG. 10B, FIG. 11A and FIG. 11B, the ranking is based on the timing of the associated SPS PDSCH instance.

In some embodiments, the ranking may be based on both of these factors. For example, in some embodiments, the ranking may be based first on the timing of the earlier invalid PUCCH and second (where the timing of the earlier invalid PUCCH is the same) based on the timing of the associated SPS PDSCH instance.

For example, where there are three outstanding HARQ-ACKs, and where the timing of the associated earlier invalid PUCCH instances and associated SPS PDSCH instances is shown in Table 1 (where to occurs earlier than tm if n<m):

TABLE 1

| HARQ-ACK | Invalid PUCCH timing | SPS PDSCH instance timing |
|---|---|---|
| A | t6-t7 | t2-t3 |
| B | t6-t7 | t4-t5 |
| C | t8-t9 | t0-t1 |

The HARQ-ACKs may be ranked C, B, A (in descending priority order): HARQ-ACKs A and B have lower priority than HARQ-ACK C, because their invalid PUCCH occurred earlier than the invalid PUCCH for HARQ-ACK C. Of HARQ-ACKs A and B, HARQ-ACK B has higher priority than HARQ-ACK A, because the associated SPS PDSCH instance for HARQ-ACK B occurred later than the SPS PDSCH instance associated with HARQ-ACK A.

If $N_{HARQ}$ is equal to two, then HARQ-ACKs C and B are selected for multiplexing and transmitting in the valid PUCCH instance.

In some embodiments, acknowledgement information for transmission in a valid PUCCH instance is selected on a HARQ-ACK by HARQ-ACK basis. However, in some embodiments, the acknowledgement information is selected on a bit-by-bit basis.

For example, in some embodiments, the acknowledgement information corresponding to all outstanding HARQ-ACKs is concatenated according to a predetermined order, and then bits are selected from the concatenated bit sequence until the selection of a further bit would result in the predetermined criteria no longer being satisfied.

In some embodiments, the concatenation of the bits is according to a conventional 3GPP Release 16 technique, whereby bits from outstanding HARQ-ACKs are concatenated in order, the order being in ascending order of downlink (DL) slot per {SPS configuration index, serving cell index}, and then in ascending order of SPS configuration index per {serving cell index}, and then in ascending order of serving cell index. The downlink slot may be the slot in which the associated SPS PDSCH occurred.

In some embodiments, the predetermined criteria are satisfied only if the total number of bits selected is less than or equal to the value of $N_{HARQ}$.

In some embodiments, bits may be selected starting from the start of the sequence of concatenated bits. In some embodiments, bits may be selected starting from the end of the sequence of concatenated bits.

In some embodiments, $N_{HARQ}$ excludes the HARQ-ACK associated with the valid PUCCH and so the selection is based on an ordering that firstly excludes any HARQ-ACK(s) associated with the valid PUCCH and then after the selection, those HARQ-ACKs that are associated with the valid PUCCH are multiplexed together with the selected outstanding HARQ-ACKs (i.e. HARQ-ACKs associated with one or more invalid PUCCHs) into the valid PUCCH.

In the examples described above, all outstanding HARQ-ACKs are considered as candidates for selection for multiplexing and transmission using a valid PUCCH instance.

In some embodiments, filter criteria may be predetermined which limit which outstanding HARQ-ACKs are considered as candidates for selection. In some embodiments, the filter criteria may be based on a layer 1 priority associated with the valid PUCCH and/or with the invalid PUCCHs associated with the outstanding HARQ-ACKs.

The layer 1 priority may be indicated by the infrastructure equipment in RRC configuration signalling for the SPS PDSCH: a PUCCH instance allocated for the transmission of acknowledgment information relating to an SPS PDSCH instance may have the layer 1 priority associated with the SPS PDSCH. The layer 1 priority may be indicated for performing intra-UE prioritisation in the event of conflicting resources.

In some embodiments, an outstanding HARQ-ACK may be considered for multiplexing and transmission within a valid PUCCH instance only if a layer 1 priority associated with the invalid PUCCH instance is the same as a layer 1 priority associated with the valid PUCCH instance. In this context, the invalid PUCCH instance refers to the PUCCH instance which would have been used for the transmission of the outstanding HARQ-ACK if all PUCCH instances were valid. In another embodiment, an outstanding HARQ-ACK may be considered for multiplexing and transmission within a valid PUCCH instance only if a layer 1 priority associated with the invalid PUCCH instance is the same as or higher than a layer 1 priority associated with the valid PUCCH instance.

FIG. 12A and FIG. 12B show the selection of outstanding HARQ-ACKs for multiplexing and transmission using a single valid PUCCH, in accordance with embodiments of the present technique, when filter criteria based on a layer 1 priority are applied.

In the example of FIG. 12A and FIG. 12B, according to the filter criteria, only those HARQ-ACKs associated with a same layer 1 priority as the valid PUCCH instance can be considered for transmission using the valid PUCCH instance. The layer 1 priority associated with a HARQ-ACK is that associated with the PUCCH instance which would have been used for the transmission of the HARQ-ACK if all PUCCH instances were valid, as indicated by the DCI activating the associated SPS PDSCH.

FIG. 12A shows an instance 1404 of a first SPS PDSCH, the first SPS PDSCH having a K1 value of 2 and associated with a low layer 1 priority. First and second instances 1406a, 1406b of a second SPS PDSCH are also shown, the second SPS PDSCH having a K1 value of 2 and associated with a high layer 1 priority. First and second instances 1408a, 1408b of a third SPS PDSCH are also shown, the third SPS PDSCH having a K1 value of 1 and associated with a low layer 1 priority.

Due to overlaps with invalid symbols, first to third PUCCH instances 1410a, 1410b, 1410c are invalid. Fourth PUCCH instance 1410d is valid.

In the example of FIG. 12A and FIG. 12B, there are thus four outstanding HARQ-ACKs 1412a-d for consideration for transmission using the valid PUCCH instance 1410d. Of these, the first, second and fourth HARQ-ACKs 1412a, 1412b, 1412d are associated with the low layer 1 priority. The third HARQ-ACK 1412c, which comprises acknowledgement information relating to the first instance 1406a of the second SPS PDSCH, is associated with the high layer 1 priority. Accordingly, the third HARQ-ACK 1412c is excluded from transmissions using the valid PUCCH instance 1410c. The first, second and fourth HARQ-ACKs 1412a, 1412b, 1412d are multiplexed and transmitted using the valid PUCCH instance 1410d, as shown in FIG. 12B.

In another example, which can also be illustrated by FIG. 12A and FIG. 12B, $N_{HARQ}$ (which is used to determine whether additional HARQ-ACKs can be multiplexed into a valid PUCCH) is 2, but the HARQ-ACK for which the valid PUCCH instance was allocated is automatically included, and thus is not considered in the $N_{HARQ}$ criteria.

In this example, the fourth HARQ-ACK 1412d which indicates the acknowledgement status of the second instance 1408b of the third SPS PDSCH is automatically included in the valid PUCCH instance 1410d, because the valid PUCCH instance 1410d is allocated for the transmission of the acknowledgement status of the second instance 1408b of the third SPS PDSCH.

The first to third HARQ-ACKs 1412a-c are then subject to filtering. As a result of the filtering, the third HARQ-ACK 1412c is excluded because it is associated with the high layer 1 priority.

The first and second HARQ-ACKs 1412a, 1412b are included for transmission using the valid PUCCH instance 1410c, without exceeding the $N_{HARQ}$ threshold.

In some embodiments, the filter criteria may be independent of the layer 1 priority associated with the valid PUCCH instance. For example, in some embodiments, only HARQ-ACKs associated with a high priority invalid PUCCH may be considered for selection. In other embodiments, only HARQ-ACKs associated with a low priority invalid PUCCH may be considered for selection.

In a further example, HARQ-ACKs associated with a low priority invalid PUCCH may be considered for selection only if there are no outstanding HARQ-ACKs associated with a high priority invalid PUCCH.

In some embodiments, the criteria for determining whether a further HARQ-ACK can be selected may also refer to the layer 1 priority of the associated (invalid) PUCCH instance. For example, where the criteria specify that $N_{HARQ}=4$, this may be partitioned such that $N_{HARQ}=3$ in respect of HARQ-ACKs associated with a high priority invalid PUCCH, and $N_{HARQ}=1$ in respect of HARQ-ACKs associated with a low priority invalid PUCCH.

Alternative or additional filter criteria may be based on the timing of an invalid PUCCH instance which would, had all PUCCH instances been valid, have been used to transmit a HARQ-ACK. The invalid PUCCH instance is referred to herein as the 'associated' PUCCH instance of the HARQ-ACK. There may be only one PUCCH instance associated with any given HARQ-ACK.

In some embodiments, HARQ-ACKs are excluded (i.e. filtered out) of the candidates if the associated PUCCH instance ends after a time $T_{LATE\text{-}START}$, where $T_{LATE\text{-}START}$ is defined as $T_{PUCCH\text{-}START} - T_{LATE}$, $T_{PUCCH\text{-}START}$ is the start of the valid PUCCH instance under consideration, and $T_{LATE}$ is a predetermined duration.

Figure 13:
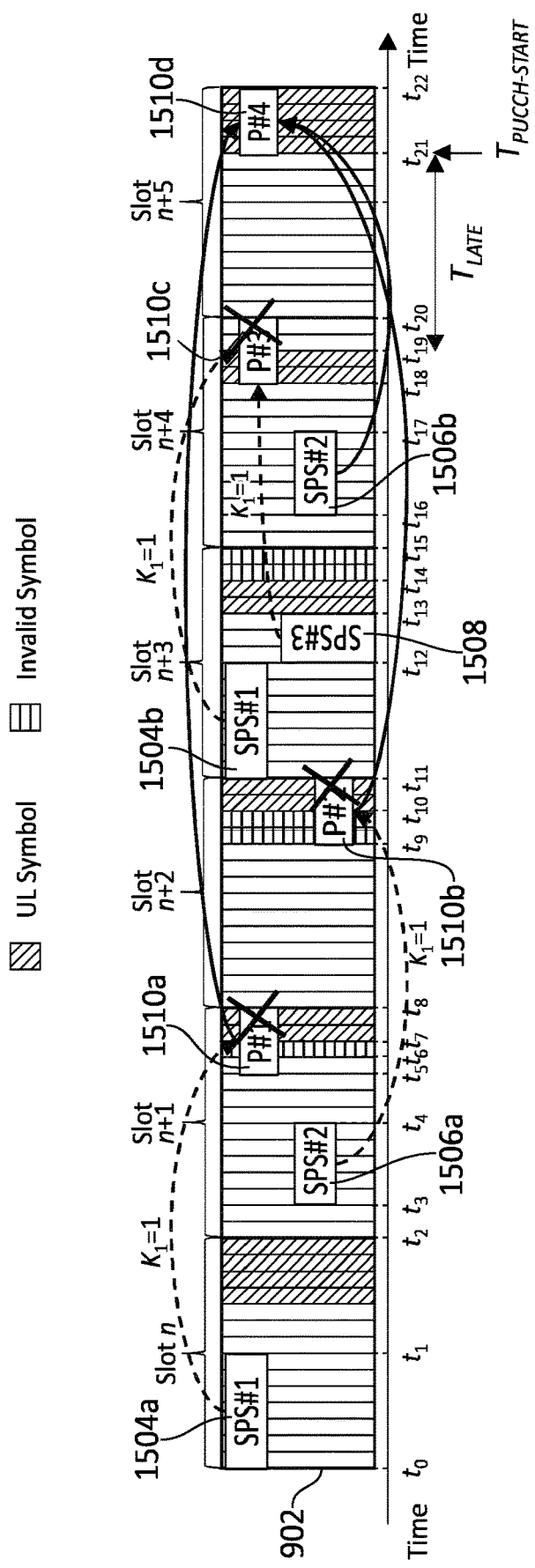
FIG. 13, FIG. 14 and FIG. 15 show the selection of outstanding portions of acknowledgement information for multiplexing and transmission using a single valid communications resource allocation, in accordance with embodiments of the present technique, when filter criteria, based on a timing of an allocated uplink communications resource which is invalid, are applied.

FIG. 13 shows the selection of outstanding HARQ-ACKs for multiplexing and transmission using a single valid PUCCH, in accordance with embodiments of the present technique, when filter criteria based on a timing of an invalid PUCCH instance are applied.

In the example of FIG. 13, two SPS PDSCH instances 1504a, 1504b of a first SPS PDSCH are shown. There are also two SPS PDSCH instances 1506a, 1506b of a second SPS PDSCH and an SPS PDSCH instance 1508 of a third SPS PDSCH. The K1 value for each of the first to third SPS PDSCHs is 1. First to third PUCCH instances 1510a, 1510b, 1510c are invalid, and the first valid PUCCH instance is the fourth PUCCH instance 1510d, which occurs from time t21 to t22.

SPS PDSCH instances are associated with respective PUCCH instances based on which PUCCH instance would be used to transmit acknowledgement information relating to which SPS PDSCH instance, if all PUCCH instances were valid. In the example of FIG. 13, the associations are as shown in Table 2:

TABLE 2

| SPS PDSCH | Instance of that SPS PDSCH and timeslot | Associated PUCCH instance, and ending time |
| --- | --- | --- |
| First | First (1504a), n | First (1510a), t8 |
| First | Second (1504b), n + 3 | Third (1510c), t20 |
| Second | First (1506a), n + 1 | Second (1510b), t11 |
| Second | Second (1506b), n + 4 | Fourth (1510d), t22 |
| Third | First (1508), n + 3 | Third (1510c), t20 |

In the example of FIG. 13, the HARQ-ACK associated with the valid PUCCH instance is automatically selected for inclusion. Accordingly, the HARQ-ACK indicating the acknowledgement status of the second instance 1506b of the second SPS PDSCH is included in the valid PUCCH instance 1510d.

In the example of FIG. 13, $T_{PUCCH\text{-}START}$ is time t21, and $T_{LATE}$ is (predetermined) 12 symbol periods. $T_{PUCCH\text{-}START} - T_{LATE}$ occurs at time t19.

Of the invalid PUCCH instances, the third PUCCH instance 1510c ends at time t20, which is after t19. The first and second invalid PUCCH instances 1510a, 1510b end at time t8 and time t11 respectively, both being before t19.

Because the third PUCCH instance 1510c ends after $T_{PUCCH\text{-}START} - T_{LATE}$, its associated HARQ-ACK(s) are filtered out and not selected for transmission using the valid PUCCH instance 1510d. These HARQ-ACKs indicate the acknowledgement status of the second instance 1504b of the first SPS PDSCH, and of the instance 1508 of the third SPS PDSCH.

In the example of FIG. 13, no $N_{HARQ}$ constraint applies, or the number of remaining HARQ-ACKs (after filtering) does not exceed $N_{HARQ}$. Accordingly, all remaining outstanding HARQ-ACKs are selected for inclusion and transmission using the valid PUCCH instance 1510d.

The valid PUCCH instance 1510d is thus used for the transmission of the HARQ-ACKs indicating the acknowledgement status of
the first and second instances 1506a, 1506b of the second SPS PDSCH and
the first instance 1504a of the first SPS PDSCH.

In some embodiments, HARQ-ACKs are excluded (i.e. filtered out) of the candidates if the associated PUCCH instance starts before a time $T_{EARLY\text{-}START}$, where $T_{EARLY\text{-}START}$ is defined as $T_{PUCCH\text{-}START} - T_{EARLY}$, and $T_{EARLY}$ is a predetermined duration.

Figure 14:
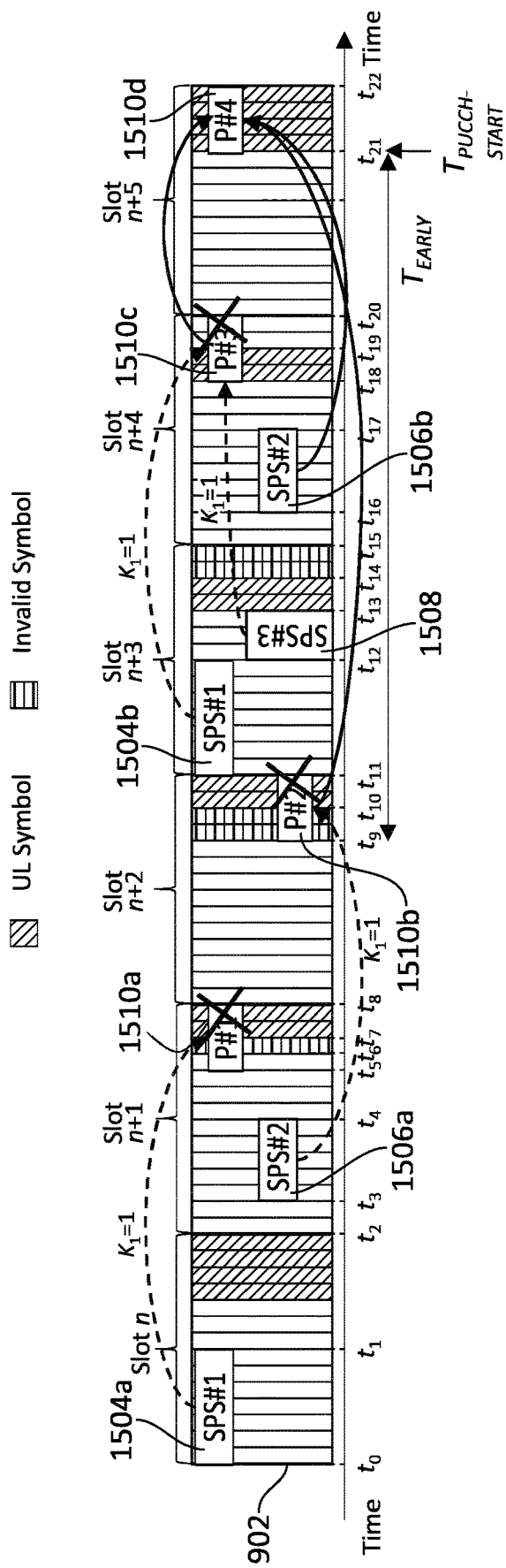

FIG. 14 shows the selection of outstanding HARQ-ACKs for multiplexing and transmission using a single valid PUCCH, in accordance with embodiments of the present technique, when filter criteria based on a timing of an invalid PUCCH instance are applied.

The example in FIG. 14 is similar to that in FIG. 13, and for conciseness only the differences will be described. In the example of FIG. 14, $T_{PUCCH\text{-}START}$ is time t21, and $T_{EARLY}$ is (predetermined) 3 slots (or 42 symbol periods). $T_{PUCCH\text{-}START} - T_{EARLY}$ occurs at time t9.

Of the invalid PUCCH instances, the first (invalid) PUCCH instance 1510a ends at time t8, which is before t9. The second and third invalid PUCCH instances 1510b, 1510c end at time t11 and time t20 respectively, both being after t9.

Because the first PUCCH instance 1510a ends before $T_{PUCCH\text{-}START} - T_{EARLY}$, its associated HARQ-ACK(s) are filtered out and not selected for transmission using the valid PUCCH instance 1510d. The affected HARQ-ACK indicates the acknowledgement status of the first instance 1504a of the first SPS PDSCH.

In the example of FIG. 14, no $N_{HARQ}$ constraint applies, or the number of remaining HARQ-ACKs (after filtering) does not exceed $N_{HARQ}$. Accordingly, all remaining outstanding HARQ-ACKs are selected for inclusion and transmission using the valid PUCCH instance 1510d.

The valid PUCCH instance 1510d is thus used for the transmission of the HARQ-ACKs indicating the acknowledgement status of
the first and second instances 1506a, 1506b of the second SPS PDSCH,
the second instance 1504b of the first SPS PDSCH, and
the instance 1508 of the third SPS PDSCH.

In some embodiments, HARQ-ACKs are excluded (i.e. filtered out) of the candidates if the associated PUCCH instance does not occur entirely within a time window. This may be equivalent to applying filter criteria based on both $T_{EARLY}$ and on $T_{LATE}$.

The time window may be defined relative to (i.e. as an offset from) the start time of the valid PUCCH instance $T_{PUCCH\text{-}START}$. For example, the time window may be defined as ending $T_{LATE}$ prior to $T_{PUCCH\text{-}START}$, and/or may be defined as starting $T_{EARLY}$ prior to $T_{PUCCH\text{-}START}$. The time window may be characterised by a duration $T_{HARQ}$. The time window may be unbounded at one end.

Figure 15:
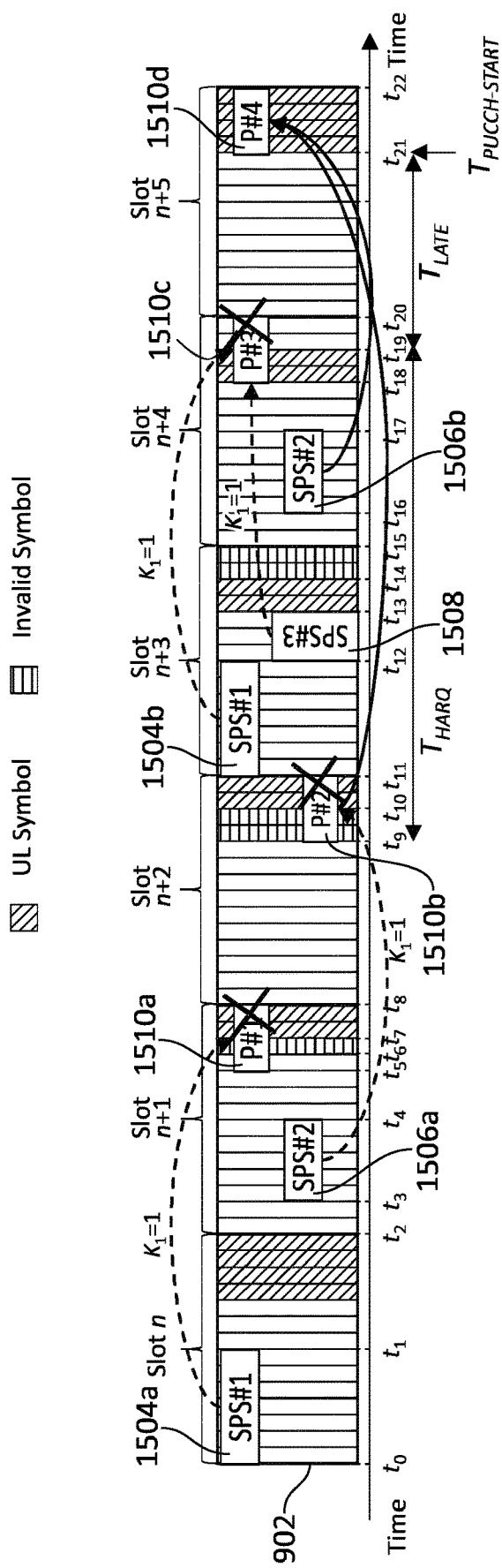

FIG. 15 shows the selection of outstanding HARQ-ACKs for multiplexing and transmission using a single valid PUCCH, in accordance with embodiments of the present technique, when filter criteria based on a timing of an invalid PUCCH instance are applied.

The example in FIG. 15 is similar to that in FIG. 13, and for conciseness only the differences will be described. In the example of FIG. 15, a time window of predetermined duration $T_{HARQ}$ (30 symbol periods) ends $T_{LATE}$ (12 symbol periods) before $T_{PUCCH-START}$.

Accordingly, the time window extends from time t9 until t19.

Because the first PUCCH instance 1510a ends (at time t8) before the start of the time window, its associated HARQ-ACK(s) are filtered out and not selected for transmission using the valid PUCCH instance 1510d. The affected HARQ-ACK indicates the acknowledgement status of the first instance 1504a of the first SPS PDSCH.

Because the third PUCCH instance 1510c ends (at time t20) after the end of the time window, its associated HARQ-ACK(s) are filtered out and not selected for transmission using the valid PUCCH instance 1510d. The affected HARQ-ACK indicates the acknowledgement status of the instance 1508 of the third SPS PDSCH and the second instance 1504b of the first SPS PDSCH.

In the example of FIG. 15, no $N_{HARQ}$ constraint applies, or the number of remaining HARQ-ACKs (after filtering) does not exceed $N_{HARQ}$. Accordingly, all remaining outstanding HARQ-ACKs are selected for inclusion and transmission using the valid PUCCH instance 1510d.

The valid PUCCH instance 1510d is thus used for the transmission of the HARQ-ACKs indicating the acknowledgement status of the first and second instances 1506a, 1506b of the second SPS PDSCH.

In some embodiments, HARQ-ACKs are excluded (i.e. filtered out) of the candidates if the communications device is not able to determine prior to $T_{INVALID}$ that the associated PUCCH instance is in fact invalid, where $T_{INVALID}=T_{PUCCH-START}-T_{PROC}$, and $T_{PROC}$ is a predetermined duration, which may be based on a processing capability of the communications device.

Depending on the manner in which the communications device is able to determine that the PUCCH instance is invalid, $T_{INVALID}$ may be:

After reading the slot format indicator (SFI) which indicates that some or all of the PUCCH instance overlaps a downlink symbol or an invalid symbol After detecting an uplink (UL) cancellation indicator (CI) indicating the PUCCH is invalid because the communications device is barred from transmitting using communication resources which overlap with the PUCCH resources. The UL CI may be transmitted in a GC-DCI (PDCCH) similar to the SFI and may indicate in advance which frequency/time region is barred from uplink transmission by certain (e.g. low priority) communications devices. As such, the UL CI may function in a similar way to an SFI but, instead of pointing to an entire symbol, it can refer to a frequency/time region and may also address only certain communications devices or certain uplink transmissions. If the time between the end of an UL CI indicating an invalid PUCCH and the start of the valid PUCCH is less than $T_{PROC}$, then in accordance with some embodiments, the communications device does not include the HARQ-ACK(s) which would have been transmitted using the invalid PUCCH in the valid PUCCH.

Figure 16:
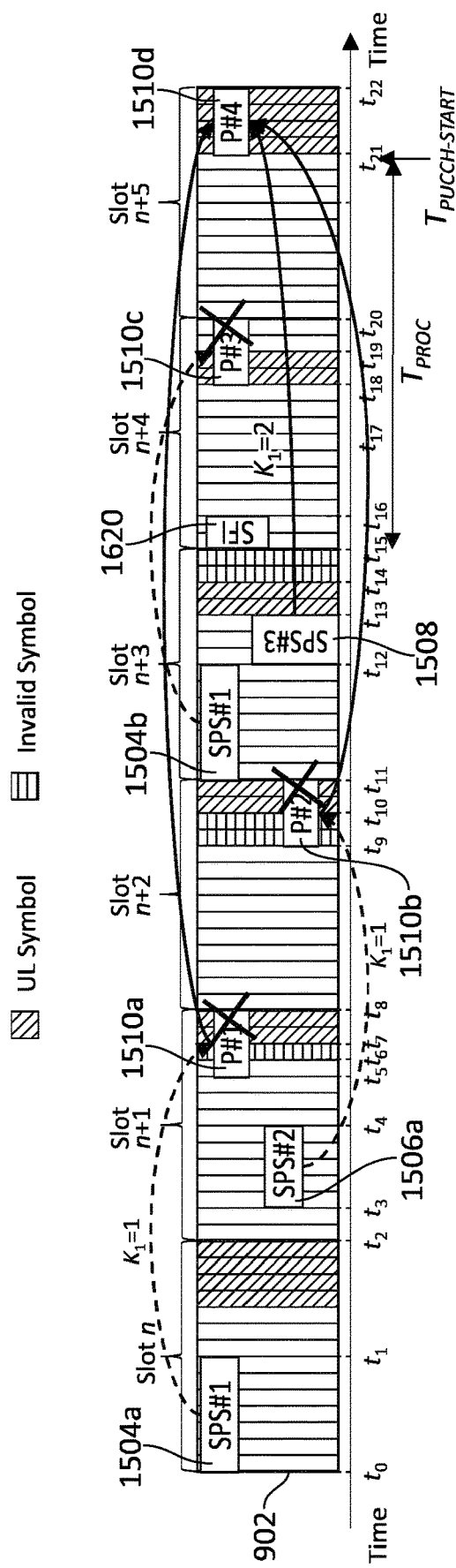
FIG. 16 shows the selection of outstanding portions of acknowledgement information for multiplexing and transmission using a single valid communications resource allocation, in accordance with embodiments of the present technique, when filter criteria, based on a timing of a determination of an invalidity of allocated uplink communications resource, are applied.

FIG. 16 shows the selection of outstanding HARQ-ACKs for multiplexing and transmission using a single valid PUCCH, in accordance with embodiments of the present technique, when filter criteria based on a timing of a determination that a PUCCH instance is invalid are applied.

The example in FIG. 16 is similar to that in FIG. 13, and for conciseness only the differences will be described. In the example of FIG. 16, only one SPS PDSCH instance 1506a of the second SPS PDSCH is shown, and the K1 value associated with the third SPS PDSCH is 2.

Shown in FIG. 16 is the transmission of a slot format indicator (SFI) 1620 from time t15 to time t16. Based on the SFI 1620, the communications device determines that the symbols from t19 to t20 are downlink symbols, and in response determines that the third PUCCH instance 1510c is invalid, because it overlaps the downlink symbols from t19 to t20.

As in the example of FIG. 13, $T_{PUCCH-START}$ for the fourth PUCCH instance 1510d is time t21. In the example of FIG. 16, $T_{PROC}$ is 24 symbol periods. Accordingly, $T_{INVALID}$ is t21-24 symbols, which is time t15.

Because t15 occurs before t16 (when the communications device is able to determine that the third PUCCH instance 1510c is invalid), the HARQ-ACK(s) associated with the third PUCCH instance 1510c are excluded from selection for transmission using the fourth (valid) PUCCH instance 1510d. The HARQ-ACK associated with the third PUCCH instance 1510c is that providing acknowledgment information regarding the second SPS PDSCH instance 1504b of the first SPS PDSCH.

Subject to any further constraints or criteria, the valid PUCCH instance 1510d may thus be used for the transmission of the HARQ-ACKs indicating the acknowledgement status of the first instance 1504a of the first SPS PDSCH, and instance 1506a of the second SPS PDSCH and the instance 1508 of the third SPS PDSCH.

In other examples described herein, the valid PUCCH instance which is used for the transmission of one or more outstanding HARQ-ACKs is a PUCCH instance allocated for the transmission of acknowledgement information regarding an SPS PDSCH instance.

In some embodiments, one or more outstanding HARQ-ACKs may be transmitted using a PUCCH instance allocated for the transmission of acknowledgement information regarding a PDSCH instance which was dynamically granted (referred to herein as a DG-PDSCH instance).

The K1 value for a DG-PDSCH instance is signalled in the associated DCI comprising the uplink grant and thus can be signalled much closer in time to the associated PUCCH instance than the K1 value for a similar SPS PDSCH instance, which is signalled at the activation of the SPS PDSCH. It is more likely that the infrastructure equipment is able to adapt the K1 value for a DG-PDSCH to account for invalid and/or downlink communications resources, which would otherwise result in the associated PUCCH instance being invalid. Thus, it is unlikely that a PUCCH instance associated with a DG-PDSCH is invalid.

Figure 17:
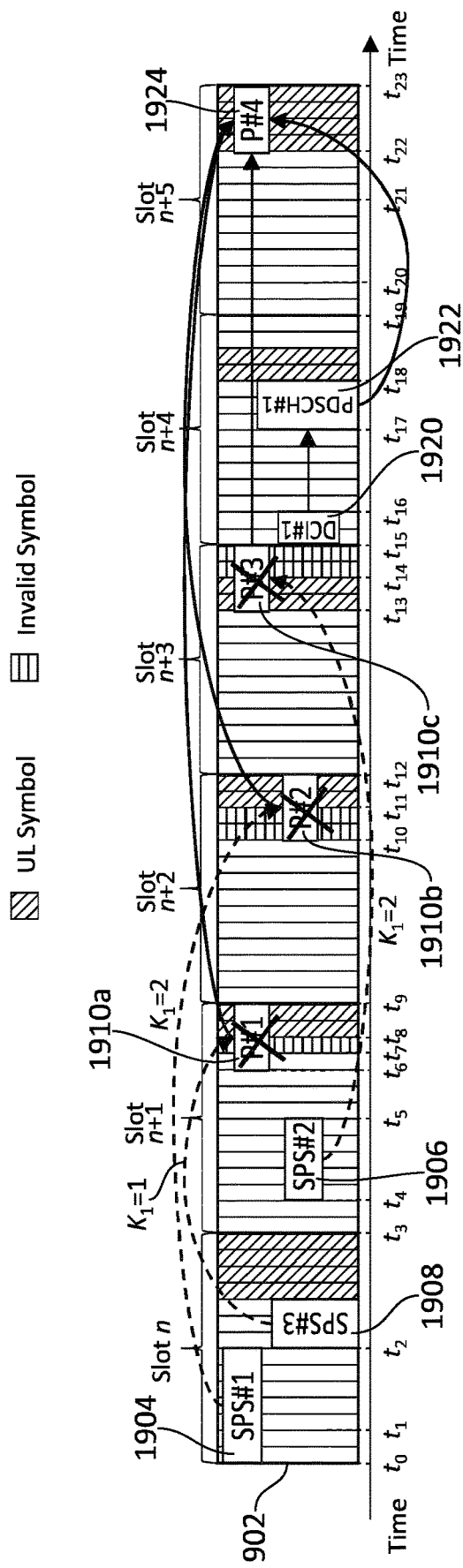
FIG. 17 shows the transmission of outstanding portions of acknowledgement information, in accordance with embodiments of the present technique, using uplink resources associated with downlink resources which are dynamically allocated.

FIG. 17 shows the transmission of outstanding HARQ-ACKs using a single valid PUCCH, in accordance with embodiments of the present technique, where the single valid PUCCH is associated with downlink resources which are dynamically allocated.

In the example of FIG. 17, there are three SPS PDSCHs. One SPS PDSCH instance is shown of each (1904, 1906, 1908). The first to third SPS PDSCHs have K1 values of 2, 2 and 1, respectively. Due to overlapping downlink or invalid symbol periods, the associated PUCCH instances 1910a, 1910b, 1910c are all invalid.

A DCI 1920 allocates downlink resources for a DG-PDSCH instance 1922, and uplink resources for a PUCCH instance 1924, which is valid.

In accordance with embodiments of the present technique, there are three outstanding HARQ-ACKs, associated with respective SPS PDSCH instances. The three outstanding HARQ-ACKs are multiplexed and transmitted, together with the HARQ-ACK associated with the DG-PDSCH, using the valid PUCCH instance 1924 which was allocated by the DCI 1920.

In some embodiments, the outstanding HARQ-ACKs are transmitted using communication resources allocated for uplink transmission of data using a shared channel, such as a physical uplink shared channel (PUSCH).

In some embodiments one or more outstanding HARQ-ACKs may be multiplexed with the data and transmitted using the PUSCH instance. In some embodiments, this may be done only if the PUSCH instance collides with (e.g. overlaps in time) a PUCCH instance allocated to the same communications device, and the PUSCH instance and the PUCCH instance are associated with the same layer 1 priority.

In the examples disclosed herein, only one valid PUCCH instance (or PUSCH instance) is considered. However, there may be multiple valid communication resources which may be suitable for the transmission of one or more outstanding HARQ-ACKs.

In some embodiments, the multiple valid communication resources are considered in time order, starting with the earliest-occurring instance.

Figure 18:
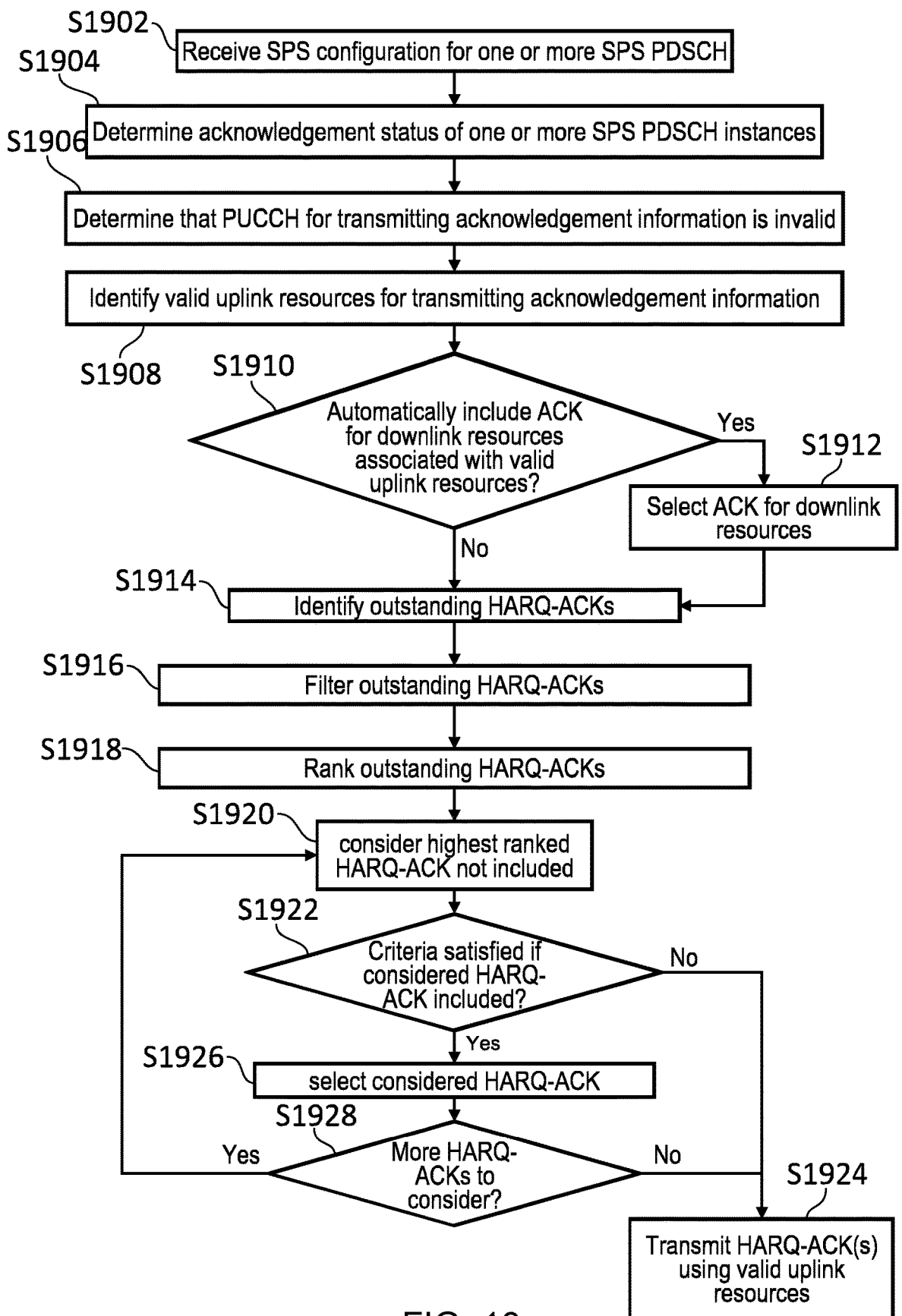
FIG. 18 is a flow chart for a process which may be carried out by the communications device in accordance with embodiments of the present technique.

FIG. 18 is a flow chart for a process which may be carried out by the communications device in accordance with embodiments of the present technique.

The process starts at step S1902, in which the communications device receives an indication of an SPS PDSCH. The SPS PDSCH indication may be transmitted by means of RRC signalling by the infrastructure equipment.

The SPS PDSCH indication indicates a plurality of downlink communication resources for the transmission of data by the infrastructure equipment to the communications device. In some embodiments, the infrastructure equipment may refrain from transmitting using one or more instances if, for example, it has no data to transmit to the communications device.

Subsequently (not shown in FIG. 18) the SPS PDSCH may be activated, for example by means of an activation DCI transmitted by the infrastructure equipment.

At step S1904, following an instance of downlink communication resources associated with the SPS PDSCH, the communications device determines an acknowledgement status for the instance. The acknowledgement status may indicate that some or all of data which was transmitted using the instance was correctly received and decoded.

At step S1906, the communications device determines that uplink communication resources allocated for the transmission of acknowledgement information representing the acknowledgement status are invalid. Because the resources are invalid, the communications device cannot transmit the acknowledgment information, and it is therefore considered as 'outstanding' (i.e. not yet transmitted) acknowledgement information.

As described elsewhere herein, uplink communication resources may be invalid if they coincide with resources which are otherwise designated as downlink or unused transmission resources. The designation may be by means of a slot format indicator (SFI) transmitted by the infrastructure equipment.

Subsequently, at step S1908, the communications device identifies valid communication resources which are valid, and may be used for the transmission of outstanding acknowledgement information. The valid communication resources may be a later instance of uplink communication resources allocated as part of the SPS PDSCH for the transmission of acknowledgement information. The valid communication resources may be allocated for the transmission of acknowledgement information associated with data transmitted using dynamically granted downlink communication resources. The valid communication resources may be allocated for the transmission of uplink data by the communications device, but may nevertheless be suitable for transmission of acknowledgement information (either together with, or instead of, the uplink data).

At step S1910, the communications device determines whether the uplink communication resources are allocated for the transmission of acknowledgement information and, if so, whether such acknowledgement information is to be automatically selected for transmission using the valid uplink communication resources. For example, where the uplink communication resources are PUCCH resources allocated for the transmission of acknowledgement information associated with a corresponding downlink PDSCH transmission, then it is determined whether such acknowledgement information is to be selected for transmission using PUCCH resources.

If not, the control passes to step S1914.

If so ('Yes') then control passes to step S1912 and the acknowledgement information is automatically selected for transmission using the valid uplink communication resources, and control passes to step S1914.

At step S1914, outstanding acknowledgement information is identified (e.g. outstanding HARQ-ACKs, or outstanding portions of acknowledgement information). Where acknowledgement information is automatically selected in step S1912, then that acknowledgement information is not considered as outstanding. Otherwise, that acknowledgement information (if it exists) is considered as outstanding.

At step S1916, filter criteria are applied to the acknowledgement information identified in step S1914. As disclosed herein, these may be based on the layer 1 priority associated with the valid uplink resources, the layer 1 priorities associated with the invalid communication resources allocated for the transmission of the acknowledgement information, and/or the relative timing of the valid uplink resources and the invalid uplink communication resources.

At step S1918, acknowledgement information portions which satisfy the filter criteria are ranked. This ranking may be based on the timing of the downlink communication resources associated with the acknowledgment information, or the timing of the associated invalid uplink communication resources.

At step S1920, the highest ranked portion of acknowledgement information which has not yet been considered for selection is identified. At step S1922, it is determined whether the selection of the highest ranked acknowledgement information would cause predetermined criteria to be satisfied. The predetermined criteria may relate to a maximum number of selected portions of acknowledgement information or a maximum code rate.

If the criteria would not be satisfied, then the selection ends and control passes to step S1924.

If the criteria would be satisfied, then control passes to step S1926 and the identified portion of acknowledgement information is selected for transmission using the valid uplink communication resources.

After step S1926, control passes to step S1928. At step S1928, if there are further portions of acknowledgement information to consider, then control returns to step S1920. Otherwise, control passes to step S1924.

At step S1924, the selected acknowledgement information portions are transmitted using the valid uplink communication resources. This step may comprise multiplexing (e.g. one or more of concatenating, joint encoding, or other processes) the selected acknowledgement information portions.

The process then ends.

In some embodiments, the process of FIG. 18 may be repeated, for example starting from step S1904 (if a further SPS PDSCH instance occurs next) or starting from step S1908 (if valid uplink resources occur next). Accordingly, HARQ-ACKs which, in one iteration of the process were identified as outstanding but were not transmitted using valid PUCCH resources, may be identified as outstanding in a subsequent iteration of the process and may be transmitted using later valid PUCCH resources.

Embodiments of the present technique also provide corresponding methods for an infrastructure equipment, such as the infrastructure equipment 272 of FIG. 3.

A process for the infrastructure equipment, in accordance with embodiments of the present technique, may comprise one or more of the following steps:

- a transmission of a configuration of periodic resources, allocated for the downlink transmission of data to a communications device. This may comprise the use of RRC signalling to configure one or more SPS PDSCH;
- an activation of the periodic resources, such as by means of a DCI transmission to the communications device;
- a transmission indicating a status of one or more communication resources. The indication may be, for example a slot format indicator. Uplink resources allocated for the transmission for acknowledgement information may conflict with the status indication, such that the uplink resources are not valid. The acknowledgement information may be associated with an instance of the periodic downlink resources;
- reception of multiplexed acknowledgement information transmitted by the communications device.

In some embodiments, the multiplexed acknowledgement information comprises one or more outstanding HARQ-ACKs selected in accordance with one or more techniques disclosed herein, such as based on a ranking and/or on a filtering.

In some embodiments, the infrastructure equipment may determine the outstanding HARQ-ACKs, apply the ranking and/or filtering and thus determine which downlink communication resource instances are associated with HARQ-ACKs which are included in the transmission. In some embodiments, the infrastructure equipment may determine that one or more uplink resources are invalid, and in response, may transmit an indication of the HARQ-ACKs to be selected for transmission using the valid uplink resources. In some embodiments, the uplink transmission may comprise an indication of the HARQ-ACKs which are included.

In some embodiments, the infrastructure equipment may transmit an indication of one or more parameters, the filter and/or ranking criteria being based on the indicated one or more parameters.

Accordingly, embodiments of the present technique can provide techniques for transmitting, with low latency acknowledgement information associated with data transmitted using periodic, semi-statically allocated resources. Embodiments can also provide for the reliable transmission of such acknowledgement information. Embodiments of the present technique can also ensure that capabilities of the communications device (such as processing capabilities) are reasonable and/or are taken into account when selecting acknowledgement information for transmission. Embodiments of the present technique can avoid the transmission of acknowledgement information which may be old and thus of limited use (for example, because it relates to an earlier transmission of data which has subsequently been retransmitted).

Embodiments of the present technique can provide a deterministic approach for selecting a subset of portions of acknowledgement information.

It will be appreciated that the present disclosure is not limited to the specific examples described above. Within the scope of the present disclosure are combinations of and modifications to the examples. For example, although the described examples use timeslots as the units of K1, in some embodiments, sub-slot, or any other suitable unit of time may be used.

In the examples described herein, only a single PUCCH instance is shown within a given slot. However, in some embodiments, there may be multiple PUCCH instances, from which the illustrated PUCCH instance is selected.

In the example process shown in FIG. 18, steps may be re-ordered, modified or deleted. For example, in some embodiments, the determination at step S1910 may be omitted, and control may pass directly from step S1908 to step S1912. In some embodiments, step S1916 may be omitted. In some embodiments, steps S1918, S1920, S1922, S1926 may be omitted.

Various parameters have been described herein, such as $T_{LATE}$, $N_{HARQ}$ and the like. In some embodiments, these are specified in associated standards specifications. In some embodiments, one or more of these may be configured by the infrastructure equipment, by means of RRC configuration, or may be dynamically updated by means of, for example, an indication in a DCI.

In some embodiments, the value of one or more parameters (which may include one or more of $N_{HARQ}$, $R_{UCI}$, $T_{LATE}$, $T_{EARLY}$ and $T_{HARQ}$), may be indicated by the activation DCI associated with the SPS PDSCH which is associated with the valid uplink PUCCH. Where the valid uplink PUCCH is associated with dynamically granted downlink resources, the value of one or more parameters may be indicated by the DCI which allocates the downlink resources. Where the valid uplink communication resources are on a shared channel (e.g. on a PUSCH) and/or are allocated for the transmission of data by the communications device, the value of one or more parameters may be indicated by the DCI which allocates the uplink resources.

In some embodiments, the infrastructure equipment may indicate which HARQ-ACKs the communications device is to select for transmission using the valid uplink communication resources. The indication may be by means of a DCI. For example, referring to the example in FIG. 17, the DCI 1920 may comprise an indication that only HARQ-ACKs associated with the instance 1908 of the third SPS PDSCH and associated with the dynamically-granted downlink resources 1922 are to be transmitted using the valid PUCCH instance 1924.

This indication may be within a DL Grant scheduling the valid PUCCH, or an UL Grant scheduling a PUSCH, where the PUSCH carries uplink control information for a colliding PUCCH.

In the examples disclosed above, an outstanding HARQ-ACK results whenever acknowledgement information associated with a downlink SPS PDSCH instance cannot be transmitted using the associated PUCCH resource. However, in some embodiments, the communications device determines whether acknowledgement information is to be generated, based on the signals received using the downlink SPS PDSCH instance. No outstanding HARQ-ACK may be generated if the communications device determines that no data was transmitted by the infrastructure equipment using the downlink SPS PDSCH instance.

In some embodiments, the filter criteria may be based on a relative timing of the end of an SPS PDSCH instance and the start of the valid uplink communication resources. For example, if the time between the end of a non-empty SPS PDSCH instance (where the associated PUCCH resources are invalid) and the start of the valid uplink PUCCH is less than a predetermined duration (e.g. $T_{PROC}$) then the communications device excludes the HARQ-ACK(s) from selection for transmission using the valid PUCCH resources.

In some embodiments, filter criteria are defined which depend on the timing of certain communication resources. In some embodiments, the timing of the communication resources may be characterised by a start time of the resources. In some embodiments, the timing of the communication resources may be characterised by an end time of the resources. In some embodiments, such as where a time window is defined, the entire communication resource instance must be contained within the time window for the resources to be considered 'within' the time window.

Above have been given descriptions of example processes combining sequences of steps and messages in combination. The scope of the present disclosure is not, however, limited to such specific combinations and in some embodiments, various of the steps and messages described may be omitted, or combined in a different manner or order, or otherwise modified. Features or steps described in the context of one example may be combined with features or steps described in the context of another example.

Thus there has been described a method of transmitting acknowledgement information, the method comprising receiving from an infrastructure equipment of a wireless communications network an indication of a plurality of instances of downlink communications resources associated with a semi-persistent resource allocation, the plurality of instances of downlink communications resources allocated for the transmission of data by the infrastructure equipment to the communications device via a wireless access interface, determining that one or more uplink communication resources allocated for the transmission of a portion of acknowledgement information indicating an acknowledgement status of a respective instance of the downlink communication resources is invalid and cannot be used for the transmission of the acknowledgement information, selecting, from a plurality of outstanding portions of acknowledgement information which have not been transmitted, a subset of portions of acknowledgement information, and transmitting to the infrastructure equipment the selected subset of portions of acknowledgement information using a single instance of uplink communication resources.

There has also been disclosed a method of receiving acknowledgement information at an infrastructure equipment of a wireless communications network, the method comprising transmitting to a communications device an indication of a plurality of instances of downlink communications resources associated with a semi-persistent resource allocation, the plurality of instances of downlink communications resources allocated for the transmission of data by the infrastructure equipment to the communications device via a wireless access interface, receiving a subset of portions of acknowledgement information transmitted using a single instance of uplink communication resources, the subset selected from a plurality of outstanding portions of acknowledgement information which have not been transmitted by the communications device.

Corresponding apparatus, circuitry and computer readable media have also been described.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches can be applied in respect of any type communications device receiving data.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of transmitting acknowledgement information, the method comprising receiving from an infrastructure equipment of a wireless communications network an indication of a plurality of instances of downlink communications resources associated with a semi-persistent resource allocation, the plurality of instances of downlink communications resources allocated for the transmission of data by the infrastructure equipment to the communications device via a wireless access interface, determining that one or more uplink communication resources allocated for the transmission of a portion of acknowledgement information indicating an acknowledgement status of a respective instance of the downlink communication resources is invalid and cannot be used for the transmission of the acknowledgement information, selecting, from a plurality of outstanding portions of acknowledgement information which have not been transmitted, a subset of portions of acknowledgement information, and transmitting to the infrastructure equipment the selected subset of portions of acknowledgement information using a single instance of uplink communication resources.

Paragraph 2. A method according to paragraph 1, the method comprising transmitting to the infrastructure equipment a second selected subset of portions of acknowledgement information using a second instance of uplink communication resources.

Paragraph 3. A method according to paragraph 1 or paragraph 2, wherein each of the plurality of outstanding portions of acknowledgement information indicates an acknowledgement status associated with a respective one of the plurality of instances of downlink communication resources.

Paragraph 4. A method according to paragraph 3, wherein each of the respective ones of the plurality of instances of downlink communication resources are associated with an allocation of uplink communication resources for transmitting acknowledgement information which are invalid and cannot be used for the transmission of acknowledgement information by the communications device.

Paragraph 5. A method according to any of paragraphs 1 to 4, wherein the wireless access interface is a time-division duplex wireless access interface, and each of the invalidly allocated uplink communication resources comprise communication resources which are designated for downlink transmission or are designated for no transmission.

Paragraph 6. A method according to any of paragraphs 1 to 5, wherein all of the plurality of instances of downlink communication resources are allocated by means of a same associated semi-persistent scheduling configuration.

Paragraph 7. A method according to any of paragraphs 1 to 6, wherein the single instance of uplink communication resources is allocated on a physical uplink control channel for the transmission of one or more of the outstanding portions of acknowledgement information.

Paragraph 8. A method according to any of paragraphs 1 to 6, wherein the single instance of uplink communication resources is allocated on a physical uplink control channel for the transmission of further acknowledgement information.

Paragraph 9. A method according to paragraph 8, the method comprising transmitting using the single instance of uplink communication resources the further acknowledgement information.

Paragraph 10. A method according to paragraph 8 or paragraph 9, wherein the further acknowledgement information indicates an acknowledgement status associated with downlink communication resources allocated by means of a semi-persistent scheduling allocation.

Paragraph 11. A method according to paragraph 8 or paragraph 9, wherein the further acknowledgement information indicates an acknowledgement status associated with downlink communication resources allocated by means of a dynamic grant.

Paragraph 12. A method according to any of paragraphs 1 to 6, wherein the single instance of uplink communication resources is allocated on a physical uplink shared channel.

Paragraph 13. A method according to any of paragraphs 1 to 12, wherein selecting the subset of the portions of acknowledgement information comprises applying a ranking to some or all of the plurality of outstanding portions of acknowledgement information, and selecting portions of acknowledgement information from the ranked outstanding portions of acknowledgement information while a predetermined threshold is not exceeded.

Paragraph 14. A method according to paragraph 13, wherein the predetermined threshold is exceeded when a number of selected portions of acknowledgement information exceeds a predetermined maximum number.

Paragraph 15. A method according to paragraph 13 or paragraph 14, wherein the predetermined threshold is exceeded when a code rate required to transmit the selected portions of acknowledgement information using the single instance of uplink communication resources exceeds a predetermined maximum code rate.

Paragraph 16. A method according to any of paragraphs 13 to 15, wherein according to the ranking, first acknowledgement information is ranked higher than second acknowledgement information, if first uplink communication resources which were invalidly allocated for the transmission of the first acknowledgement information occur later than second uplink communication resources invalidly allocated for the transmission of the second acknowledgement information.

Paragraph 17. A method according to any of paragraphs 13 to 16, wherein according to the ranking, first acknowledgement information is ranked higher than second acknowledgement information, if the first acknowledgement information indicates the acknowledgement status associated with downlink communication resources which occur later than downlink communication resources associated with an acknowledgement status indicated by the second acknowledgement information.

Paragraph 18. A method according to any of paragraphs 1 to 17, wherein the selected subset includes only portions of acknowledgement information which satisfy predetermined filter criteria.

Paragraph 19. A method according to paragraph 18, the method comprising determining the filter criteria based on a priority associated with the single instance of uplink communication resources used for transmitting the selected subset of portions of acknowledgement information.

Paragraph 20. A method according to paragraph 18 or paragraph 19, wherein a portion of acknowledgement information satisfies the predetermined filter criteria if uplink communication resources which were invalidly allocated for the transmission of the acknowledgement data are associated with a particular priority.

Paragraph 21. A method according to paragraph 20, wherein the particular priority is a priority associated with the single instance of uplink communication resources used for transmitting the selected subset of portions of acknowledgement information.

Paragraph 22. A method according to any of paragraphs 18 to 21, the method comprising determining a time of uplink communication resources associated with a portion of acknowledgement information.

Paragraph 23. A method according to paragraph 22, the method comprising determining a latest start time based on a start time of the single instance of uplink communication resources and a predetermined duration, wherein the portion of acknowledgement information does not satisfy the predetermined filter criteria if the determined time occurs after the determined latest start time.

Paragraph 24. A method according to paragraph 22 or paragraph 23, the method comprising determining an earliest start time based on a start time of the single instance of uplink communication resources and a second predetermined duration, wherein the portion of acknowledgement information does not satisfy the predetermined filter criteria if the determined time occurs before the determined earliest start time.

Paragraph 25. A method of receiving acknowledgement information at an infrastructure equipment of a wireless communications network, the method comprising transmitting to a communications device an indication of a plurality of instances of downlink communications resources associated with a semi-persistent resource allocation, the plurality of instances of downlink communications resources allocated for the transmission of data by the infrastructure equipment to the communications device via a wireless access interface, receiving a subset of portions of acknowledgement information transmitted using a single instance of uplink communication resources, the subset selected from a plurality of outstanding portions of acknowledgement information which have not been transmitted by the communications device.

Paragraph 26. A method according to paragraph 25, the method comprising transmitting an indication of a status of communication resources, wherein, based on the status of the communication resources, one or more uplink communication resources allocated for the transmission of a portion of acknowledgement information indicating an acknowledgement status of a respective instance of the downlink communication resources is invalid and cannot be used for the transmission of the acknowledgement information.

Paragraph 27. A method according to paragraph 25 or paragraph 26, the method comprising determining the selected subset of portions of acknowledgement information.

Paragraph 28. A method according to paragraph 27, the method comprising transmitting to the communications device an indication of the selected subset.

Paragraph 29. A method according to any of paragraphs 25 to 27, the method comprising transmitting an indication of one or more parameters, wherein the subset of portions of acknowledgement information are selected from the plurality of outstanding portions of acknowledgement information, the one or more parameters comprising one or more of a maximum number of portions of acknowledgement information, a maximum code rate, a time window end offset, a time window start offset, and a time window duration.

Paragraph 30. A method according to any of paragraphs 25 to 29, wherein the wireless access interface is a time-division duplex wireless access interface, and each of the invalidly allocated uplink communication resources comprise communication resources which are designated for downlink transmission or are designated for no transmission.

Paragraph 31. A communications device for operating in a wireless communications network, the communications device comprising a transmitter configured to transmit signals on a wireless access interface provided by an infrastructure equipment of the wireless communications network, a receiver configured to receive signals on the wireless access interface, and a controller configured to control the transmitter and the receiver so that the communications device is operable to receive from an infrastructure equipment of a wireless communications network an indication of a plurality of instances of downlink communications resources associated with a semi-persistent resource allocation, the plurality of instances of downlink communications resources allocated for the transmission of data by the infrastructure equipment to the communications device via a wireless access interface, to determine that one or more uplink communication resources allocated for the transmission of a portion of acknowledgement information indicating an acknowledgement status of a respective instance of the downlink communication resources is invalid and cannot be used for the transmission of the acknowledgement information, to select, from a plurality of outstanding portions of acknowledgement information which have not been transmitted, a subset of portions of acknowledgement information, and to transmit to the infrastructure equipment the selected subset of portions of acknowledgement information using a single instance of uplink communication resources.

Paragraph 32. Circuitry for a communications device for operating in a wireless communications network, the circuitry comprising transmitter circuitry configured to transmit signals on a wireless access interface provided by an infrastructure equipment of the wireless communications network, receiver circuitry configured to receive signals on the wireless access interface, and controller circuitry configured to control the transmitter circuitry and the receiver circuitry so that the communications device is operable to receive from an infrastructure equipment of a wireless communications network an indication of a plurality of instances of downlink communications resources associated with a semi-persistent resource allocation, the plurality of instances of downlink communications resources allocated for the transmission of data by the infrastructure equipment to the communications device via a wireless access interface, to determine that one or more uplink communication resources allocated for the transmission of a portion of acknowledgement information indicating an acknowledgement status of a respective instance of the downlink communication resources is invalid and cannot be used for the transmission of the acknowledgement information, to select, from a plurality of outstanding portions of acknowledgement information which have not been transmitted, a subset of portions of acknowledgement information, and to transmit to the infrastructure equipment the selected subset of portions of acknowledgement information using a single instance of uplink communication resources.

Paragraph 33. Infrastructure equipment for use in a wireless communications network, the infrastructure equipment providing a wireless access interface, the infrastructure equipment comprising a transmitter configured to transmit signals via the wireless access interface, a receiver configured to receive signals, and a controller configured to control the transmitter and the receiver so that the infrastructure equipment is operable to transmit to a communications device an indication of a plurality of instances of downlink communications resources associated with a semi-persistent resource allocation, the plurality of instances of downlink communications resources allocated for the transmission of data by the infrastructure equipment to the communications device via the wireless access interface, to receive a subset of portions of acknowledgement information transmitted using a single instance of uplink communication resources, the subset selected from a plurality of outstanding portions of acknowledgement information which have not been transmitted by the communications device.

Paragraph 34. Circuitry for infrastructure equipment for use in a wireless communications network, the infrastructure equipment providing a wireless access interface, the circuitry comprising transmitter circuitry configured to transmit signals via the wireless access interface, receiver circuitry configured to receive signals, and controller circuitry configured to control the transmitter circuitry and the receiver circuitry so that the infrastructure equipment is operable to transmit to a communications device an indication of a plurality of instances of downlink communications resources associated with a semi-persistent resource allocation, the plurality of instances of downlink communications resources allocated for the transmission of data by the infrastructure equipment to the communications device via the wireless access interface, to receive a subset of portions of acknowledgement information transmitted using a single instance of uplink communication resources, the subset selected from a plurality of outstanding portions of acknowledgement information which have not been transmitted by the communications device.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP TS 38.300 v. 15.2.0 "NR; NR and NG-RAN Overall Description; Stage 2 (Release 15)", June 2018
[2] Holma H. and Toskala A, "LTE for UMTS OFDMA and SC-FDMA based radio access", John Wiley and Sons, 2009
[3] 3GPP TR 38.913, "Study on Scenarios and Requirements for Next Generation Access Technologies (Release 14)", v14.3.0
[4] 3GPP Tdoc RP-190726, "Physical layer enhancements for NR ultra-reliable and low latency communication (URLLC)," Huawei, HiSilicon, RAN #83
[5] 3GPP Tdoc RP-201310, "Revised WID. Enhanced Industrial Internet of Things (IoT) and ultra-reliable and low latency communication (URLLC) support for NR," Nokia, Nokia Shanghai Bell, RAN #88e
[6] 3GPP Tdoc R1-2007354, "Feature lead summary #4 on HARQ-ACK feedback enhancements for NR Rel-17 URLLC/IIoT (AI 8.3.1.1)," Moderator (Nokia), RAN1 #102-e
[7] 3GPP Tdoc R1-2005431, "Discussion on HARQ-ACK enhancements for eURLLC," ZTE, RAN1 #102-e
[8] 3GPP Tdoc R1-2006339, "On the necessity and support of Rel-17 URLLC HARQ-ACK feedback enhancements," Nokia, Nokia Shanghai Bell, RAN1 #102-e

What is claimed is:

1. A method of transmitting acknowledgement information, the method comprising:
receiving from an infrastructure equipment of a wireless communications network an indication of a plurality of instances of downlink communications resources associated with a semi-persistent resource allocation, the plurality of instances of downlink communications resources allocated for the transmission of data by the infrastructure equipment to the communications device via a wireless access interface,
determining that one or more uplink communication resources allocated for the transmission of a portion of acknowledgement information indicating an acknowledgement status of a respective instance of the downlink communication resources is invalid and cannot be used for the transmission of the acknowledgement information,
selecting, from a plurality of outstanding portions of acknowledgement information which have not been transmitted, a subset of portions of acknowledgement information,
transmitting to the infrastructure equipment the selected subset of portions of acknowledgement information using a single instance of uplink communication resources,
dropping at least part of the plurality of outstanding portions of acknowledgement information that are not part of the subset of portions of acknowledgement information selected, and
removing the at least part of the plurality of outstanding portions of acknowledgement information from the plurality of outstanding portions of acknowledgement information,
wherein selecting the subset of the portions of acknowledgement information comprises:
applying a ranking to at least part of the plurality of outstanding portions of acknowledgement information based on communication resources associated thereto, and
selecting portions of acknowledgement information from the ranked outstanding portions of acknowledgement information in order of the ranking while a predetermined threshold is not exceeded.

2. The method according to claim 1, the method comprising transmitting to the infrastructure equipment a second selected subset of portions of acknowledgement information using a second instance of uplink communication resources.

3. The method according to claim 1, wherein each of the plurality of outstanding portions of acknowledgement information indicates an acknowledgement status associated with a respective one of the plurality of instances of downlink communication resources.

4. The method according to claim 3, wherein each of the respective ones of the plurality of instances of downlink communication resources are associated with an allocation of uplink communication resources for transmitting acknowledgement information which are invalid and cannot be used for the transmission of acknowledgement information by the communications device.

5. The method according to claim 1, wherein the wireless access interface is a time-division duplex wireless access interface, and each of the invalidly allocated uplink communication resources comprise communication resources which are designated for downlink transmission or are designated for no transmission.

6. The method according to claim 1, wherein all of the plurality of instances of downlink communication resources are allocated by a same associated semi-persistent scheduling configuration.

7. The method according to claim 1, wherein the single instance of uplink communication resources is allocated on a physical uplink control channel for the transmission of one or more of the outstanding portions of acknowledgement information.

8. The method according to claim 1, wherein the single instance of uplink communication resources is allocated on a physical uplink control channel for the transmission of further acknowledgement information.

9. The method according to claim 8, the method comprising transmitting using the single instance of uplink communication resources the further acknowledgement information.

10. The method according to claim 8, wherein the further acknowledgement information indicates an acknowledgement status associated with downlink communication resources allocated by a semi-persistent scheduling allocation.

11. The method according to claim 8, wherein the further acknowledgement information indicates an acknowledgement status associated with downlink communication resources allocated by a dynamic grant.

12. The method according to claim 1, wherein the single instance of uplink communication resources is allocated on a physical uplink shared channel.

13. The method according to claim 1, wherein the predetermined threshold is exceeded when a number of selected portions of acknowledgement information exceeds a predetermined maximum number.

14. The method according to claim 1, wherein the predetermined threshold is exceeded when a code rate required to transmit the selected portions of acknowledgement information using the single instance of uplink communication resources exceeds a predetermined maximum code rate.

15. The method according to claim 1, wherein according to the ranking, first acknowledgement information is ranked higher than second acknowledgement information, if first uplink communication resources which were invalidly allocated for the transmission of the first acknowledgement information occur later than second uplink communication resources invalidly allocated for the transmission of the second acknowledgement information.

16. The method according to claim 1, wherein according to the ranking, first acknowledgement information is ranked higher than second acknowledgement information, if the first acknowledgement information indicates the acknowledgement status associated with downlink communication resources which occur later than downlink communication resources associated with an acknowledgement status indicated by the second acknowledgement information.

17. The method according to claim 1, wherein the selected subset includes only portions of acknowledgement information which satisfy predetermined filter criteria.

18. A communications device for operating in a wireless communications network, the communications device comprising:
  a transmitter configured to transmit signals on a wireless access interface provided by an infrastructure equipment of the wireless communications network,
  a receiver configured to receive signals on the wireless access interface, and
  a controller configured to control the transmitter and the receiver so that the communications device is operable
    to receive from an infrastructure equipment of a wireless communications network an indication of a plurality of instances of downlink communications resources associated with a semi-persistent resource allocation, the plurality of instances of downlink communications resources allocated for the transmission of data by the infrastructure equipment to the communications device via a wireless access interface,
    to determine that one or more uplink communication resources allocated for the transmission of a portion of acknowledgement information indicating an acknowledgement status of a respective instance of the downlink communication resources is invalid and cannot be used for the transmission of the acknowledgement information,
    to select, from a plurality of outstanding portions of acknowledgement information which have not been transmitted, a subset of portions of acknowledgement information,
    to transmit to the infrastructure equipment the selected subset of portions of acknowledgement information using a single instance of uplink communication resources,
    to drop at least part of the plurality of outstanding portions of acknowledgement information that are not part of the subset of portions of acknowledgement information selected, and
    to remove the at least part of the plurality of outstanding portions of acknowledgement information from the plurality of outstanding portions of acknowledgement information,
  wherein to select the subset of the portions of acknowledgement information, the controller is further configured to:
  apply a ranking to at least part of the plurality of outstanding portions of acknowledgement information based on communication resources associated thereto, and
  select portions of acknowledgement information from the ranked outstanding portions of acknowledgement information in order of the ranking while a predetermined threshold is not exceeded.

19. Infrastructure equipment for use in a wireless communications network, the infrastructure equipment providing a wireless access interface, the infrastructure equipment comprising:
  a transmitter configured to transmit signals via the wireless access interface,
  a receiver configured to receive signals, and
  a controller configured to control the transmitter and the receiver so that the infrastructure equipment is operable
    to transmit to a communications device an indication of a plurality of instances of downlink communications resources associated with a semi-persistent resource allocation, the plurality of instances of downlink communications resources allocated for the transmission of data by the infrastructure equipment to the communications device via the wireless access interface,
    to receive a subset of portions of acknowledgement information transmitted using a single instance of uplink communication resources, the subset selected from a plurality of outstanding portions of acknowledgement information which have not been transmitted by the communications device, at least part of the plurality of outstanding portions of acknowledgement information that are not part of the subset of portions of acknowledgement information selected are dropped and removed from the plurality of outstanding portions of acknowledgement information, wherein wherein the subset of the portions of acknowledgement information is selected by:

applying a ranking to at least part of the plurality of outstanding portions of acknowledgement information based on communication resources associated thereto, and selecting portions of acknowledgement information from the ranked outstanding portions of acknowledgement information in order of the ranking while a predetermined threshold is not exceeded.

* * * * *